(12) United States Patent
Merg

(10) Patent No.: US 12,346,192 B2
(45) Date of Patent: Jul. 1, 2025

(54) METHOD AND SYSTEM OF PERFORMING DIAGNOSTIC FLOWCHART

(71) Applicant: Snap-on Incorporated, Kenosha, WI (US)

(72) Inventor: Patrick S. Merg, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 95 days.

(21) Appl. No.: 17/392,299

(22) Filed: Aug. 3, 2021

(65) Prior Publication Data

US 2021/0365309 A1 Nov. 25, 2021

Related U.S. Application Data

(63) Continuation of application No. 15/225,806, filed on Aug. 1, 2016.

(51) Int. Cl.
*G06F 11/00* (2006.01)
(52) U.S. Cl.
CPC .................................. *G06F 11/00* (2013.01)
(58) Field of Classification Search
CPC ...................................................... G06F 11/00
See application file for complete search history.

(56) References Cited

U.S. PATENT DOCUMENTS 6,609,050 B2  8/2003 Li
7,551,993 B1  6/2009 Cancilla et al.
(Continued)

FOREIGN PATENT DOCUMENTS

JP  2007193456 A  8/2007
WO  02/17118 A2  2/2002

OTHER PUBLICATIONS

Just Answer Chevy; Distributor . . . wires are good, new coil and module and connector; showing Driveability and Emissions 5.7 (VIN P), section 6E3-A-71 published Oct. 7, 1992; downloaded from the World Wide Web at http://WWW.justanswer.com/chevy/3ty2f-distributor-wires-good-new-coil-module-connector.html on Nov. 4, 2016, 8 pages.

(Continued)

*Primary Examiner* — Li B. Zhen
*Assistant Examiner* — Henry Nguyen
(74) *Attorney, Agent, or Firm* — McDonnell Boehnen Hulbert & Berghoff LLP

(57) ABSTRACT

Methods and system pertaining to performing a diagnostic flowchart are described. A method includes determining a first input indicative of a vehicle problem, and transmitting a request indicative of the problem to a server. The method includes receiving a diagnostic flowchart associated with the vehicle problem. Each diagnostic flowchart includes one or more path elements. Each path element is ordered within the diagnostic flowchart and performable. Each path element leads to one or more ordered decision elements. Each path element comprises one or more diagnostic steps. The method includes outputting a GUI including at least a portion of diagnostic flowchart, and determining a second input indicative of an instruction to perform a first path element of the diagnostic flowchart. The method further includes performing the first path element, determining first feedback data associated with performing the first path element, and outputting the first feedback data onto a display.

23 Claims, 11 Drawing Sheets

(56) References Cited

U.S. PATENT DOCUMENTS

| | | |
|---|---|---|
| 7,957,860 B2 | 6/2011 | Grier et al. |
| 8,370,018 B2 | 2/2013 | Andreasen et al. |
| 2001/0032114 A1 | 10/2001 | Sinex |
| 2002/0007237 A1* | 1/2002 | Phung ................ G05B 23/0275 709/219 |
| 2005/0060007 A1 | 3/2005 | Goetz |
| 2005/0171661 A1 | 8/2005 | Abdel-Malek et al. |
| 2005/0193252 A1 | 9/2005 | Cancilla et al. |
| 2006/0025897 A1 | 2/2006 | Shostak et al. |
| 2007/0294001 A1 | 12/2007 | Underdal et al. |
| 2007/0294090 A1 | 12/2007 | Thieret et al. |
| 2008/0005628 A1 | 1/2008 | Underdal et al. |
| 2008/0183351 A1 | 7/2008 | Grier et al. |
| 2012/0041638 A1 | 2/2012 | Johnson et al. |
| 2012/0046807 A1 | 2/2012 | Ruther et al. |
| 2012/0046826 A1 | 2/2012 | Panko |
| 2013/0110344 A1* | 5/2013 | Merg ..................... G07C 5/085 701/31.4 |
| 2014/0075356 A1 | 3/2014 | Gray et al. |
| 2014/0096608 A1* | 4/2014 | Themm ..................... G01L 1/00 73/579 |
| 2015/0105973 A1* | 4/2015 | Cicala ................... G07C 5/008 701/34.4 |
| 2016/0011618 A1 | 1/2016 | Janous et al. |
| 2016/0140515 A1* | 5/2016 | Katsumata ............. G06Q 10/20 705/7.25 |
| 2016/0198310 A1* | 7/2016 | Chalmers ............... H04K 3/415 455/456.1 |
| 2017/0058809 A1* | 3/2017 | Kim ................... F02D 41/0035 |
| 2017/0337618 A1* | 11/2017 | Berkooz ............. B60R 16/0236 |
| 2018/0032909 A1 | 2/2018 | Merg |
| 2019/0331802 A1 | 10/2019 | Zhang |

OTHER PUBLICATIONS

Damien Coleman, Snap-on Diagnostic & Equipment article, Technical Focus, Testing an EGR Valve, Dec. 2015, 5 pages.

* cited by examiner

METHOD AND SYSTEM OF PERFORMING DIAGNOSTIC FLOWCHART

REFERENCE TO RELATED APPLICATION

This application is a continuation application of U.S. patent application Ser. No. 15/225,806, which was filed on Aug. 1, 2016 and was published as United States Patent Application Publication No. 2018/0032909 A1 on Feb. 1, 2018. U.S. patent application Ser. No. 15/225,806 and United States Patent Application Publication No. 2018/0032909 A1 are incorporated herein by reference.

BACKGROUND

Most vehicles are serviced at least once during their useful life. In many instances, a vehicle is serviced at a facility with professional mechanics (e.g., technicians). The technicians may use any of a variety of hand tools to service (e.g., repair) any of the wide variety of mechanical components on a vehicle. The technicians may also use electronic diagnostic equipment to service (e.g., diagnose) any of the wide variety of electrical components on a vehicle. The technician may need different data during various stages of servicing the vehicle in conjunction with or without the various tools and equipment.

OVERVIEW

Several example embodiments that related to modifying diagnostic flowcharts based on performance of the flowcharts are described herein.

In one respect, an example embodiment can take the form of a method performed by a computing server, the method comprising: (i) receiving, from a diagnostic computing device, a request indicative of a vehicle problem, (ii) selecting a first diagnostic flowchart associated with the vehicle problem from a plurality of diagnostic flowcharts, wherein each diagnostic flowchart comprises one or more ordered and performable path elements, wherein each path element leads to one or more decision elements, and wherein each path element comprises one or more diagnostic steps, (iii) sending the first diagnostic flowchart for performance at the diagnostic computing device, (iv) determining first feedback data associated with a performance of the first diagnostic flowchart at the diagnostic computing device, and (v) modifying the first diagnostic flowchart based at least on the first feedback data.

In another respect, an example embodiment takes the form of a method performed by a diagnostic computing device, the method comprising: (i) determining that a first input indicates a vehicle problem, (ii) sending a first request indicative of the vehicle problem to a computing server, (iii) receiving from the computing server a first diagnostic flowchart associated with the vehicle problem, wherein the first diagnostic flowchart comprises one or more ordered and performable path elements, wherein each path element leads to one or more ordered decision elements, wherein each path element comprises one or more diagnostic steps, (iv) outputting the first diagnostic flowchart to be displayed on a graphical interface of a display at the diagnostic computing device, (v) determining a second input to the diagnostic computing device indicates an instruction to perform at least one path element of the first diagnostic flowchart, (vi) performing the at least one path element, (vii) determining first feedback data associated with the performed at least one path element and (viii) sending the first feedback data to the computing server.

In yet another respect, an example embodiment takes the form of an apparatus comprising: (i) a display device, (ii) a network interface, (iii) one or more processors, and (iv) at least one computer-readable medium storing program instructions, that when executed by the one or more processors, cause a set of functions to be performed, the set of functions comprising: (a) determining that a first input indicates a vehicle problem, (b) sending a request indicative of the vehicle problem to a computing server, (c) receiving from the computing server a first diagnostic flowchart associated with the vehicle problem, wherein the first diagnostic flowchart comprises one or more ordered and performable path elements, wherein each path element leads to one or more ordered decision elements, wherein each path element comprises one or more diagnostic steps, (d) outputting the first diagnostic flowchart to be displayed on a graphical interface of the display device, (e) determining that a second input indicates an instruction to perform at least one path element of the first diagnostic flowchart, (f) performing the at least one path element, and (g) determining first feedback data associated with the at least one performed path element.

In still yet another respect, an example embodiment takes the form of a system comprising: (i) a computing server including one or more processors, and (ii) at least one non-transitory computer readable medium containing program instructions executable by the one or more processors to:(a) determine that first a request indicates a vehicle problem, (b) select a first diagnostic flowchart associated with the vehicle problem from a plurality of diagnostic flowcharts, wherein each diagnostic flowchart comprises one or more ordered and performable path elements, wherein each path element leads to one or more ordered decision elements, wherein each path element comprises one or more diagnostic steps, (c) send the first diagnostic flowchart for performance at a diagnostic computing device, (d) determine first feedback data associated with a performance of the first diagnostic flowchart at the diagnostic computing device, and (e) modify the first diagnostic flowchart based at least on the first feedback data.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

Figure 1:
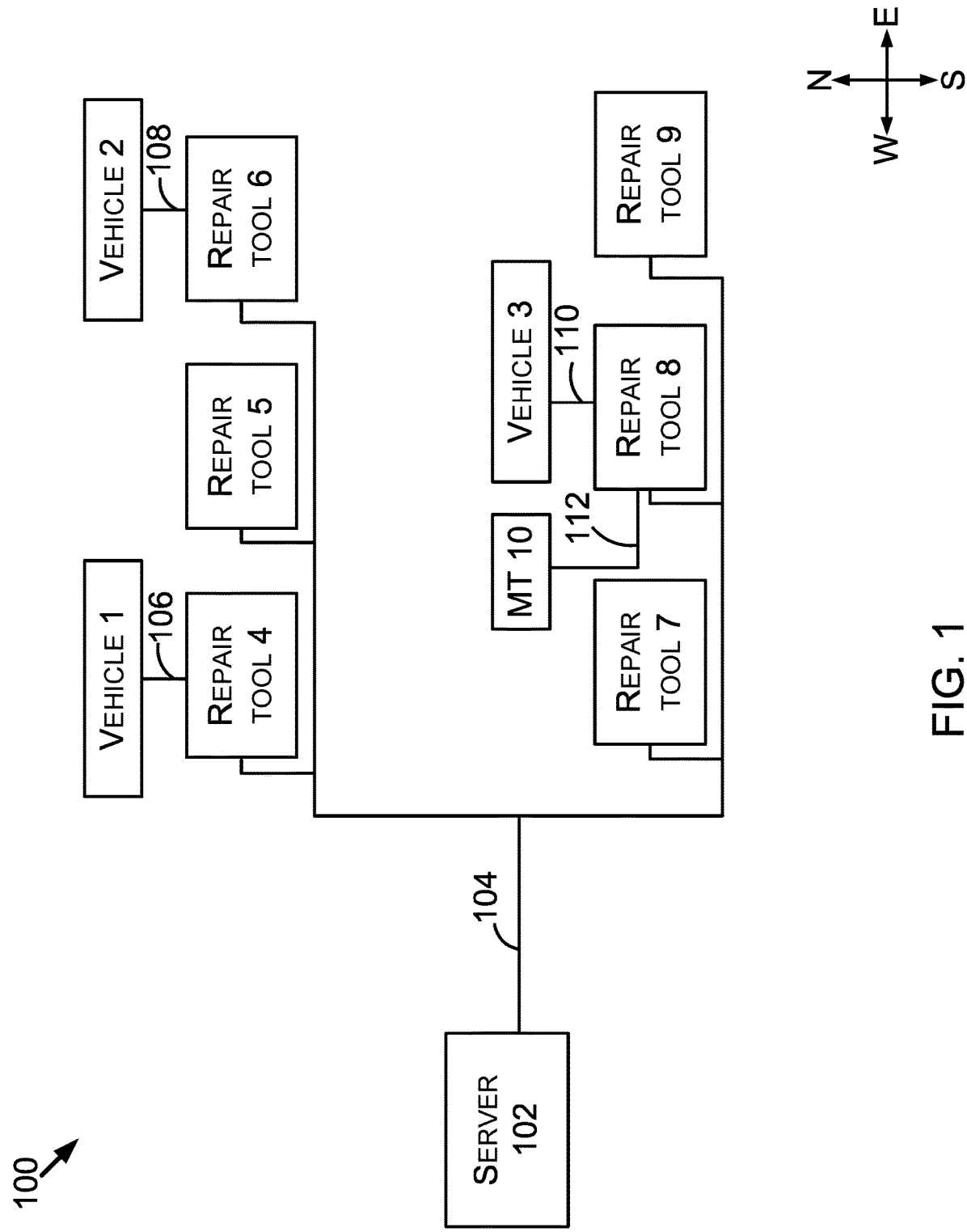
FIG. 1 is a block diagram showing components of a system in accordance with an example embodiment.

This description describes several example embodiments. At least some of those example embodiments pertain to modifying a diagnostic flowchart that includes vehicle diagnosis processes. Modifying a diagnostic flowchart can include providing the diagnostic flowchart from a server to a repair tool. The repair tool can execute diagnostic steps of the diagnostic flowchart and can provide the server with feedback associated with the executed diagnostic flowchart. The server can modify the diagnostic flowchart based on the received feedback. The server can aggregate feedback data from multiple instances of performing the diagnostic flowchart and modify the flowchart based on the aggregated feedback data. At least some of the example embodiments pertain to displaying a diagnostic flowchart and receiving feedback associated with the diagnostic flowchart. An example embodiment pertains to a server that can receive feedback associated with diagnostic flowcharts and that can modify diagnostic flowcharts based on the received feedback. An example embodiment pertains to a repair tool and components thereof for displaying a diagnostic flowchart and receiving feedback data associated with the displayed diagnostic flowchart. A person having ordinary skill in the art will understand that a diagnostic flowchart can be displayed at a display of a repair tool with or without other data. Other example embodiments are also described.

A vehicle repair tool can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a repair tool, a vehicle diagnostic tool, a diagnostic computing device, a vehicle service tool, a vehicle maintenance tool, and a vehicle repair verification tool.

A diagnostic flowchart can comprise a decision tree flowchart that includes path elements and decision elements that make up diagnostic processes for diagnosing a vehicle problem. The first element of a diagnostic flowchart is a path element that includes diagnostic steps. A diagnostic step can comprise a measurement step, a repair step, or any other instruction to carry out a specific step. A path element can also include a prompt associated with the diagnostic steps. For example, the prompt can comprise an inquiry regarding the result of one or more of the diagnostic steps. A decision element that leads from the path element can be selected in response to the prompt. Selecting a decision element that a path element leads to can indicate the response to the prompt of the path element. A path element can lead to two or more decision elements and each decision element can lead to a path element. As such, a decision element can connect between two path elements.

A repair tool or a user of the repair tool (e.g. technician) can perform a diagnostic process by starting at the first path element in the flowchart. After performing the diagnostic steps of the first path element, the repair tool or the user can respond to the prompt of the path element by selecting a decision element that leads from the path element. The next path element in the process can depend on the decision element selected. The process of performing the diagnostic steps of a path element and selecting a decision element to move to the next path element is repeated until a final path element is reached. Performing the diagnostic steps of the final path elements can result in a diagnosis of the vehicle problem. A diagnostic flowchart can include more than final path element. The final path element does not lead to any decision element. However, the final path element can include a prompt associated with the diagnosis of the vehicle in order to determine whether the diagnostic process was successful in diagnosing the vehicle problem.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to receiver via one of one or more intermediary network devices, such as an access point, an antenna, a base station, a hub, a modem, a relay, a router, a switch, or some other network device.

The diagrams, flow charts, and other data shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions (CRPI) or by a combination of hardware, firmware, or software. Furthermore still, identical reference numbers used in the same or different figures denote elements that are identical to other elements referred to by the same reference number, but those denoted elements and the other elements are no so limited.

II. Example Systems and Devices

FIG. 1 is a block diagram 100 showing components of a system. A system including a component shown in FIG. 1 can include all of the components shown in FIG. 1 or any proper subset of components shown in FIG. 1. Any one of those systems can include other components not shown in FIG. 1 as well. As an example, a first example system can include a server 102, a vehicle 1, a vehicle 2, a vehicle 3, a repair tool 4, a repair tool 5, a repair tool 6, a repair tool 7, a repair tool 8, a repair tool 9, a measurement tool (MT) 10, a vehicle-to-repair-tool communication link 106, a vehicle-to-repair tool communication link 108, a vehicle-to-repair-tool communication link 110, and a communication network 104 shown connecting the system components.

The communication network 104 can include various network components such as switches, modems, gateways, antennas, cables, transmitters, and receivers. The communication network 104 can comprise a wide area network (WAN). The WAN can carry data using a packet-switched or circuit-switched standard. The WAN can include an air interface or wire to carry the data. The air interface can be arranged in accordance with one or more wireless communication standards or protocols such as an IEEE 802.15.1 standard for wireless personal area networks (PANs), a Bluetooth version 4.1 standard developed by the Bluetooth Special Interest Group (SIG) of Kirkland, Wash., or an IEEE 802.11 standard for wireless LANs (which is sometimes referred to as a Wi-Fi standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a wire interface of network 104 can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, or some other wired communication standard.

System 100 includes the repair tools 4, 5, 6, 7, 8, and 9. Each repair tool or a combination of multiple repair tools is a machine. Any repair tool described herein can be, but is not required to be, configured to request a diagnostic flowchart from server 102. The server 102 can transmit a diagnostic flowchart to any repair tool configured to receive a diagnostic flowchart. Further, repair tools 4, 5, 6, 7, 8, and 9 represent vehicle repair tools that are configured to perform at least one of the following functions: send data indicative of a vehicle problem (e.g., a DTC) to the server 102, receive a diagnostic flowchart from the server 102 using network 104, display the received diagnostic flowchart by a display, perform diagnostic steps of a diagnostic flowchart, and determine feedback data associated with the diagnostic flowchart. Repair tools 4, 5, 6, 7, 8, and 9 can receive a diagnostic flowchart the server 102 transmits to the repair tool over the network 104 using wireless and/or wired communications.

Further, each repair tool can be located in a repair shop. The repair tool can be located in a shop located in a geographic region. For example, the repair tool 4 can be located in a shop located in San Jose, California. Further, each of the repair tools can be located in a repair shop located in a different geographic region. For example, the repair tools 6 and 8 can be located in shops located in San Diego, California. and Atlanta, Georgia, respectively. As another example, the compass illustrated in FIG. 1 can indicate the geographic region that a repair tool is located in with respect to true north. For example, the compass directions can be roughly be indicative of geographic regions of the United States with respect to true north. As such, repair tool 4 can be located in a Northwestern state such as Washington.

A repair shop can also include a measurement tool (MT), such as MT 10. A measurement tool can be used to carry out (i.e., perform) a measurement. For example, the tool measurement can include a compression measurement of one or more engine cylinders in a vehicle. As another example, the tool measurement can be a thickness measurement of a brake part such as a brake rotor, brake drum, brake caliper, a brake pad, or a brake shoe performed using a measurement caliper. As illustrated in FIG. 1, a MT can be coupled to a repair tool, such as repair tool 8. For example, MT 10 can be coupled to repair tool 8 via the MT-to-repair tool measurement link 112. A repair tool can send instructions to an MT to perform a specific measurement on a vehicle, such as vehicle 3. The repair tool can subsequently receive the measurement from the MT.

A vehicle, such as the vehicle 1, 2, or 3, is a mobile machine that can be used to transport a person, people, or cargo. As an example, any vehicle described herein can be driven or otherwise guided along a path (e.g., a paved road or otherwise) on land, in water, or in the air or outer space. As another example, any vehicle described herein can be wheeled, tracked, railed or skied. As yet another example, any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, any vehicle described herein can include or use any appropriate voltage or current source, such as a battery, an alternator, a fuel cell, and the like, providing any appropriate current or voltage, such as about 12 volts, about 42 volts, and the like. As still yet another example, any of the vehicles described herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein can include an electronic control unit (ECU), a data link connector (DLC), and a vehicle communication link that connects the DLC to the ECU.

A vehicle can be in a repair shop to repair a vehicle problem. A repair tool can be used to diagnose the vehicle problem. In order to diagnose the problem, the repair tool can be coupled to a vehicle by a vehicle-to-repair-tool communication link. A first end of the vehicle-to-repair-tool communication links 106, 108, and 110 can connect to a DLC within the vehicle 1, a DLC within the vehicle 2, and a DLC within vehicle 3, respectively, and a second end of the vehicle-to-repair-tool communication links 106, 108, and 110 can connect to the repair tool 4, the repair tool 6, and the repair tool 8 respectively. A vehicle-to-repair-tool communication link can carry vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined or that can be defined in the future for performing communications within a vehicle.

The vehicle-to-repair-tool communication links 106, 108, and 110 can include one or more conductors (e.g., copper wire conductors) or can be wireless. In accordance with the example embodiments in which a communication link, such as the vehicle-to-repair-tool communication link 106, 108, or 110, or any other communication link described herein, communicates data wirelessly, such wireless communication of data can be carried out in accordance with a wireless communication protocol (e.g., a wireless communication standard). As an example, a wireless communication protocol can include an Institute of Electrical and Electronics Engineers (IEEE) 802.15.1 standard for wireless personal area networks (PANs) or a Bluetooth version 4.1 standard developed by the Bluetooth Special Interest Group (SIG) of Kirkland, Wash. As another example, the wireless communication protocol can include an IEEE 802.11 standard for wireless LANs, which is sometimes referred to as a "Wi-Fi®  standard." As another example, the wireless communication protocol can include a cellular phone standard, such as standard for 3G or 4G cellular phone communications developed by the $3^{rd}$ Generation Partnership Project (3GPP). Other examples of a wireless communication protocol are also possible. Alternatively, the vehicle-to-repair-tool communication links 106, 108, and 110 can include one or more conductors for carrying data (i.e. a VDM).

A DLC within a vehicle can include an on-board diagnostics (OBD) II connector. An OBD II connector can include slots for retaining up to 16 connector terminals, but can include a different number of slots or no slots at all. As an example, the DLC connector can include an OBD II connector that meets the SAE J1962 specification such as a connector 16M, part number 12110252, available from Delphi Automotive LLP of Troy, Michigan. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication link such that the DLC is communicatively connected to the ECU. The repair tools that are connectable to a vehicle can include a DB-25 connector, an Ethernet connector, a Universal Serial Bus connector or some other connector for connecting to the vehicle-to-repair-tools communication links 106, 108, or 110.

The ECU can control various aspects of vehicle operation or components within a vehicle, such as the vehicle 1. For example, the ECU can include a powertrain system ECU, an engine control module (ECM) ECU, a supplemental inflatable restraint system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle.

Transmission of a VDM can occur over a vehicle communication link within a vehicle. In that way, a VDM can be transmitted to the DLC and, in turn, to a repair tool connected to the vehicle. A VDM can include data such as (i) an ECU identifier, (ii) a parameter identifier (PID), (iii) a mode identifier that identifies a current data mode, a freeze frame data mode, a vehicle information mode, a DTC mode, or some other mode, (iv) a parameter value, (v) data identifying a characteristic of the vehicle (e.g., a vehicle identification number (VIN)), or (vi) some other vehicle data. As an example, a VDM that indicates the engine revolutions per minute (RPM) of an engine within a vehicle can comprise the hexadecimal data "41 0C 0F A0," where "41" represents a response to a mode 01 request, "0C" is a PID indicating engine RPM, and "0F A0" is the parameter value representing the RPM (¼ RPM per bit). In this case, the hexadecimal value "0F A0" equals 4,000. At ¼ RPM per bit, the engine RPM represented by the example VDM is 1,000 RPM. The data within a VDM can be used as feedback data with respect to performance of a diagnostic flowchart. The repair tool can associate particular data within a VDM message with a particular element of the diagnostic flowchart.

A repair tool can operate through use of an electrical current provided to it from a vehicle battery by way of a DLC and a communication link, or by another electrical energy source. For example, the repair tools 4-9 can include an electrical energy source, such as a battery, or the repair tools 4-9 can receive an electrical current for its operation from an electrical energy source other than a vehicle or an internal battery, such as an alternating electrical current available at a wall outlet.

The server 102 can include one or more servers. A server, such as server 102 or any other server described in this description, can be referred to as a "computer server" or a "server computing system." The server can process requests transmitted over the network 104 from the repair tools 4-9. Those requests can be arranged according to a hyper-text transmission protocol (HTTP), a file transfer protocol (FTP), or according to another protocol. As an example, a request processed by the server 102 can include data indicative of a vehicle problem. Processing a request by the server 102 can include searching data stored on a computer-readable medium for a diagnostic flowchart based on the vehicle problem.

A request can include data pertaining to a vehicle problem. The request can also include a vehicle identifier. A vehicle identifier can include data indicative of a vehicle model, a vehicle part, and/or vehicle characteristics. In that regard, a basis for searching the computer-readable medium of a server can include a vehicle model, a vehicle part, or vehicle characteristics. Accordingly, a vehicle identifier can include data indicative of, for example, a year (Y), make ($M_1$), model ($M_2$), engine (E), and system (S) pertaining to the vehicle 1, 2, or 3. An abbreviation for those characteristics is $YM_1M_2ES$. As another example, the data included in the vehicle identifier that identifies a vehicle can be $YM_1M_2$ or $YM_1M_2E$. The data identifying characteristics of the vehicle can include a vehicle identification number (VIN) or some portion of a VIN. The data identifying characteristics of the vehicle can include data that indicates characteristics of an instance of a vehicle exhibiting a vehicle symptom or characteristics of a plurality of vehicles having common characteristics, such as $YM_1M_2ES$, $YM_1M_2$, or $YM_1M_2E$. The characteristics of a particular vehicle can include a serial number within the VIN. A vehicle characteristic can indicate a sub-model, an engine size, a fuel-type (e.g., diesel or unleaded), a region where the vehicle was built, or other characteristic represented by the VIN.

The data identifying characteristics of the vehicle, or at least of some of the characteristics of the vehicle, can be implied. For example, if a vehicle manufacturer manufactured a particular model only during the calendar or mode year 2014, then the year for such a vehicle can be implied by the data that identifies the make and model of the vehicle, such that the data identifying characteristics of the vehicle would not need to include the year.

Figure 2:
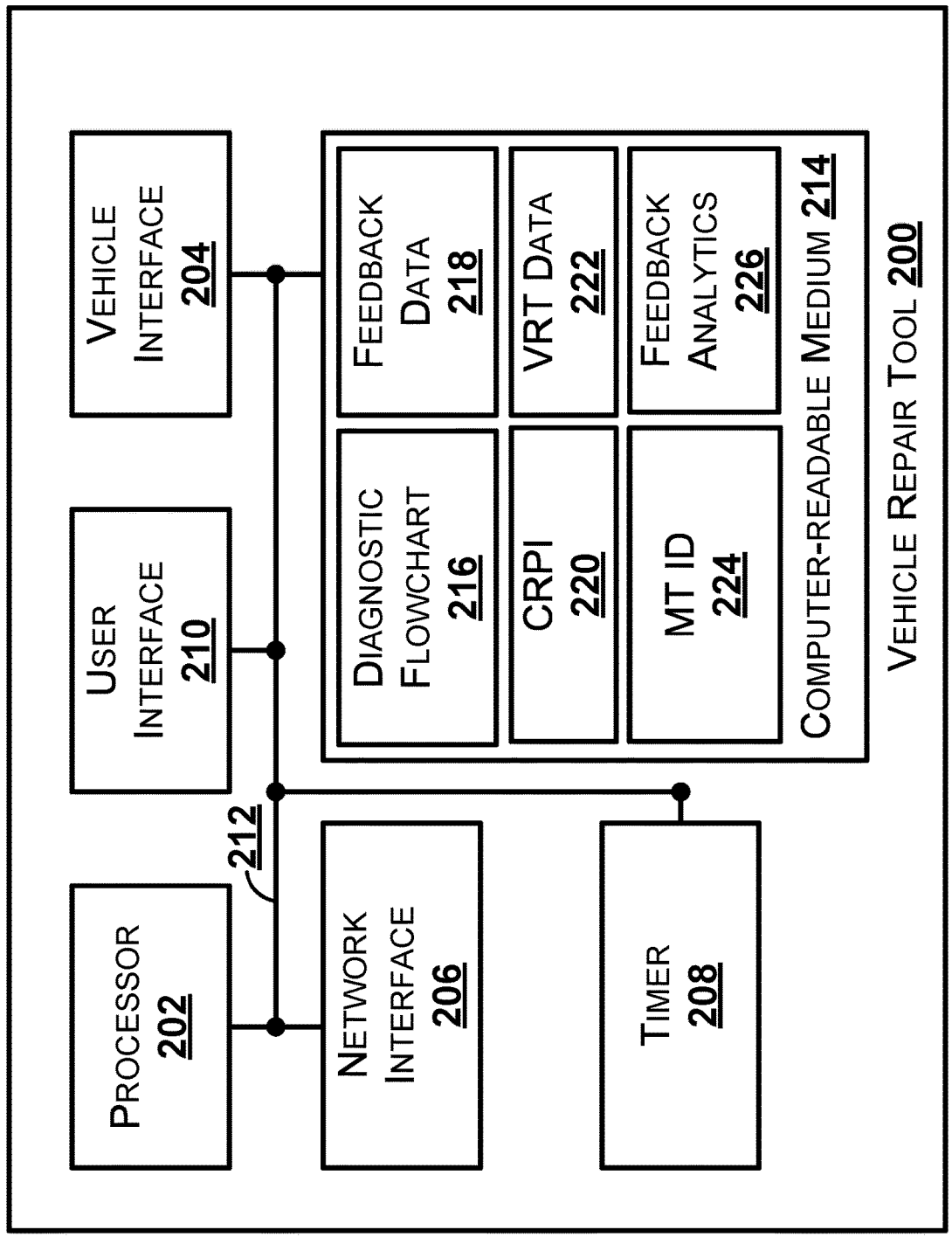
FIG. 2 is a block diagram of a vehicle repair tool in accordance with an example embodiment.

Next, FIG. 2 is a block diagram of a vehicle repair tool (or more simply "repair tool") 200. The repair tool 200 can include all of the components shown in FIG. 2 or any proper subset of the components shown within the display device in FIG. 2. For example, the vehicle repair tool 200 can include a processor 202, a vehicle interface 204, a network interface 206, a timer 208, a user interface 210, and a computer-readable medium (CRM) 214. Two or more of the aforementioned components shown in FIG. 2 can be communicatively coupled or linked together via a system bus, network, or other connection mechanism 212. A repair tool (e.g., repair tool 4 or 5-9) shown in FIG. 1 can include, or can be configured as, the repair tool 200. A repair tool shown in FIG. 1 can include all or any proper subset of the components of the repair tool 200. Two or more of the components shown within the repair tool 200 can be located within a single housing. Two or more of the components shown within the repair tool 200 can be located remotely from each other in different housings or otherwise.

A processor, such as the processor 202 or any other processor discussed in this description or included within a device or system described in this description (hereinafter, "a described processor"), can include one or more general purpose processors (e.g., INTEL® single core microprocessors or INTEL® multicore microprocessors) or one or more special purpose processors (e.g., digital signal processors or graphics processors). A graphics processor can be configured to access and use the CRM 214 for retrieving, from the diagnostic flowchart 216, a displayable diagnostic flowchart to display on a display device of the user interface 210. Additionally and/or alternatively, a described processor can include an application specific integrated circuit (ASIC). A described processor can be configured to execute computer-readable program instructions (CRPI), such as CRPI 220 stored in the CRM 214. A described processor can be configured to execute hard-coded functionality in addition to or as an alternative to software-coded functionality (e.g., via CRPI).

A computer-readable medium, such as the CRM 214 or any other computer-readable medium discussed in this description or included within a device or system described in this description, can include a non-transitory computer-readable medium, a transitory computer-readable medium, or both a non-transitory computer-readable medium and a transitory computer-readable medium. In one respect, a non-transitory computer-readable medium can be integrated in whole or in part with a processor. In another respect, a non-transitory computer-readable medium, or a portion thereof, can be separate and distinct from a processor.

A non-transitory computer-readable medium can include, for example, a volatile or non-volatile storage component, such as an optical, magnetic, organic or other memory or disc storage. Additionally or alternatively, a non-transitory computer-readable medium can include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium can include, for example, CRPI provided over a communication link, such as a communication link which is connected to or is part of the network 104. The communication link can include a digital or analog communication link. The communication link can include a wired communication link or a wireless communication link.

A computer-readable medium can be referred to by other terms such as a "computer-readable storage medium," a "data storage device," a "memory device," a "memory," or a "computer-readable database." Any of those alternative terms can be preceded with the prefix "transitory" or "non-transitory."

The CRM 214 can store all of the computer-readable elements shown in the CRM 214 in FIG. 2 or any proper subset of the computer-readable elements shown within the CRM 214. For example, the CRM 214 can store CRPI 220, diagnostic flowchart 216, feedback data 218, VRT data 222, feedback analytics 226, and VRT ID 224. Other examples of computer-readable elements stored within the CRM 214 are also possible.

The diagnostic flowchart 216 can include a diagnostic flowchart received from a server, such as server 102. A diagnostic flowchart can comprise a decision tree flowchart that includes diagnostic processes that diagnose or repair a vehicle problem. A diagnostic flowchart can be associated with a vehicle problem (e.g., faults (perceived or real) complaints, DTC, etc.), such that a flowchart associated with a vehicle problem is designed to diagnose that problem. For example, a diagnostic flowchart can be associated with a DTC (e.g., P0401, P1115, etc.). Additionally, a diagnostic flowchart can be associated with one or more vehicle characteristics. For example, a diagnostic flowchart can be associated with a problem that can occur in a specific vehicle model. Preforming a diagnostic process of a diagnostic flowchart can result in diagnosing the vehicle problem. Note, in the context of this application, performing a diagnostic process of a diagnostic flowchart can also be referred to as performing a diagnostic flowchart.

The feedback data 218 can contain feedback data that can result from performing the diagnostic steps of a diagnostic process. Elements of the feedback data can include data indicative of the path elements performed, decision elements selected, diagnostic steps performed, measurements performed, success of a diagnostic process, time associated with performing elements of a diagnostic flowchart. In an example, the feedback data stored in the feedback data 218 can include measurements that result from performing a diagnostic step. The feedback including a measurement can include an identifier of the MT from the MD ID 224 that performed the measurement. The identifier of the MT may be indicative of the manufacturer that built the MT, a model number of the MT, and any applicable settings of the MT when the measurement was obtained. As another example, the feedback data 218 can include a VDM received from an ECU of a subject vehicle. As another example, data indicative of the decisions made at the decision elements can be stored in the feedback data 218. As yet another example, data indicative of the performed path elements can be stored in the feedback data 218.

As yet another example, data indicative of the success of a diagnostic process in diagnosing the problem can be stored in the feedback data 218. Other parameters can also be stored in the feedback data 218. Such parameters can include the experience level of a technician performing or overseeing the performance of the diagnostic flowchart. For example, the technician can be making decisions at the decision elements. As another example, the parameters can also include a time that it took to perform a diagnostic step. The data stored in the feedback data 218 can be transmitted by the network interface 206 to a device remote from the repair tool 200. For example, the feedback data stored in feedback data 218 can be transmitted to a server 102. The feedback data transmitted can include an identifier that identifies the diagnostic flowchart that is associated with the feedback data. For example, the identifier can be the DTC with which the diagnostic flowchart is associated.

The feedback analytics 226 can include analytical data associated with a diagnostic flowchart. The analytical data can be received by the network interface 206 from a server, such as server 102. In an example, the feedback analytics can include a statistic associated with a decision element and/or a statistic associated with a path element of a diagnostic flowchart. The statistic can be indicative of the number of times a specific element was chosen by technicians that have previously performed the diagnostic flowchart. As another example, a statistic can be indicative of the number of times one or more decision elements and/or one or more path elements were chosen/performed. A statistic stored in the feedback analytics 226 can be displayed at a display of the user interface 210. For example, the statistic can be displayed with a diagnostic flowchart with which it is associated. In such an example, the statistic can be displayed in proximity of the element with which it is associated. Other types of statistical and analytical data can be stored in feedback analytics 226.

A timer, such as the timer 208 or any other timer disclosed herein, can include a timer configured to provide time data for associating with a diagnostic step, a path element, or a diagnostic step. As an example, the timer can provide the time it took to perform a path element of a diagnostic flowchart. A timer can be integrated within a processor. Additionally, the time data of the timer 208 can be stored in feedback data 218.

The vehicle interface 204 can include one or more components for communicatively coupling the repair tool 200 to a vehicle over a communication link. The vehicle interface 204 can include a transceiver (e.g., an integrated transmitter and receiver, or a distinct transmitter and a distinct receiver). The transmitter of the vehicle interface 204 can be configured to transmit data to a vehicle. The data transmitted by the vehicle interface 204 to the vehicle can include a request for a VDM. The receiver of the vehicle interface 204 can be configured to receive data transmitted by the vehicle (i.e. a VDM) over a vehicle-to-repair-tool communication link. Accordingly, a vehicle interface 204 can include a DLC that is configured to connect to the DLC in a vehicle, a wire connector, one or more wires that connect the DLC of the vehicle interface 204 to the communication mechanism such that VDMs from the vehicle can be received by the processor 202 or another component of the repair tool 200. The processor 202 can select data from within the VDMs received from the vehicle and cause the selected data to be displayed at a display of the repair tool. The processor 202 can select data (e.g., a DTC) from within the VDMs received from the vehicle and include the selected data in a diagnostic flowchart request sent to the server 102.

The network interface 206 can include one or more components for communicatively coupling the repair tool 200 to the network 104 or to a gateway that is part of or connected to the network 104. The network interface 206 can include component(s) for wireless or wired communications via the network 104. The network interface 206 can include a modem or a network interface card. The network interface 206 can include the communication interfaces 425 shown in FIG. 10 or some portion thereof.

The network interface 206 can transmit various messages over any network that the repair tool 200 is connected to, such as network 104. As an example, a message transmitted by the network interface 206 can include a diagnostic flowchart request indicative of a vehicle problem. The request can include additional information such as vehicle characteristics of the subject vehicle that is coupled to the repair tool. As another example, a message transmitted by the network interface 206 can include any of the data contained in the CRM 214, such as the feedback data stored in the feedback data 218. As another example, a message transmitted by the network interface 206 can include instructions to an MT identified within the MT ID 224, such as the MT 900. The instructions can include an instruction for the MT to perform specific vehicle measurements on the subject vehicle that is coupled to the repair tool. Other examples of the data included within the messages transmitted by the network interface 206 are also possible.

Thus, the network interface 206 can include wires, cables, connectors, electrical circuitry, receivers, transmitters, or some other item. As an example, the network interface 206 can include Universal Serial Bus (USB) connectors and cables for connecting to an MT having a USB connector. The USB components can be configured according the USB 3.0 standard or another USB standard. As another example, the network interface 206 can include a transceiver. A transmitter can transmit radio waves carrying data and a receiver can receive radio waves carrying data. A transceiver with that transmitter and receiver can include one or more antennas and can be referred to as a "radio transceiver," an "RF transceiver," or a "wireless transceiver." The radio waves transmitted or received by a radio transceiver can be arranged in accordance with one or more wireless communication standards or protocols such as an IEEE 802.15.1 standard for wireless personal area networks (PANs), a Bluetooth version 4.1 standard developed by the Bluetooth Special Interest Group (SIG) of Kirkland, Washington, or an IEEE 802.11 standard for wireless LANs (which is sometimes referred to as a Wi-Fi standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the network 104. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The network interface 206 can receive various messages transmitted over a network, such as network 104. As an example, the network interface 206 can receive a message from a server that includes a diagnostic flowchart that is associated with a problem of the subject vehicle that is coupled to the repair tool 200. As another example, the network interface 206 can receive a message from a server that includes feedback analytical data associated with a received diagnostic flowchart. As yet another example, the network interface 206 can receive a message that includes a tool measurement data (i.e., tool measurements) from the MT 900 performing a measurement on a subject vehicle that is coupled to the repair tool 200.

The user interface 210 can include a display for displaying a display user interface (DUI). A DUI can, for example, include a graphical user interface or text-based user interface. A DUI can provide a way to input data into the repair tool 200. As an example, a DUI can display vehicle symptoms and vehicle characteristics selectable for generating a request for a diagnostic flowchart. As another example, a DUI can provide a way to enter tool measurements without or with spatial identifiers associated with a tool measurement, such as an engine cylinder number, LF, LBP, etc. As yet another example, the DUI can be configured for a user to input a selection of a decision element or a path element of a diagnostic flowchart. The selection of a path element can indicate the performance of the path element. Accordingly, the user interface 210 can include user-input elements configured so that a user (e.g., a technician) of repair tool 200 can input data for use by the processor 202 or by another element of the repair tool 200. As an example, the user-input elements can include a connection to a display in an embodiment in which the display includes a touch display. As another example, the user-input elements can include a user input section having one or more input keys. As another example, the user-input elements can include a pointing device such as a computing device mouse, a keyboard (e.g., a QWERTY keyboard), a joystick, a display pointer (e.g. the pointing device 822 shown in FIG. 8), or a microphone for receiving spoken inputs. The user input device can be used to input data and/or make a selection in the graphical interface displayed.

As another example, a DUI can display a diagnostic flowchart such as a diagnostic flowchart described herein or any aspect of any diagnostic flowchart described herein. The DUI can display analytical data associated with elements of a displayed diagnostic flowchart. The DUI can display other forms of visually-presentable data as well. The display of the user interface 210 can be configured like display 802, 806, 810, or 814 or like any example display described herein. The DUI can display any visually-presentable data provided by the processor 202 or the CRM 214. As an example, a DUI can display tool data representing a measurement measured by the MT 900.

The vehicle repair tool (VRT) data 222 can include an identifier (e.g., a serial number) of the repair tool 200. Additionally or alternatively, the VRT data 222 can include an identifier of a geographic location in which the repair tool 200 is installed and/or operational. As an example, the identifier of geographic location can be GPS coordinates of the location. The data stored in VRT data 222 can be included in the diagnostic flowchart request that is transmitted to the server 300. The VRT data 222 can also be included in the feedback data transmitted to the server.

In general, CRPI, such as the CRPI 220 or any other CRPI described herein, include program instructions executable by a processor. Further, and in general, CRPI can include various structures, modules, routines, or some other computer-readable logic. Further, and in general, CRPI can be written using a computer-programming language such as C++ or some other programming language.

Figure 7:
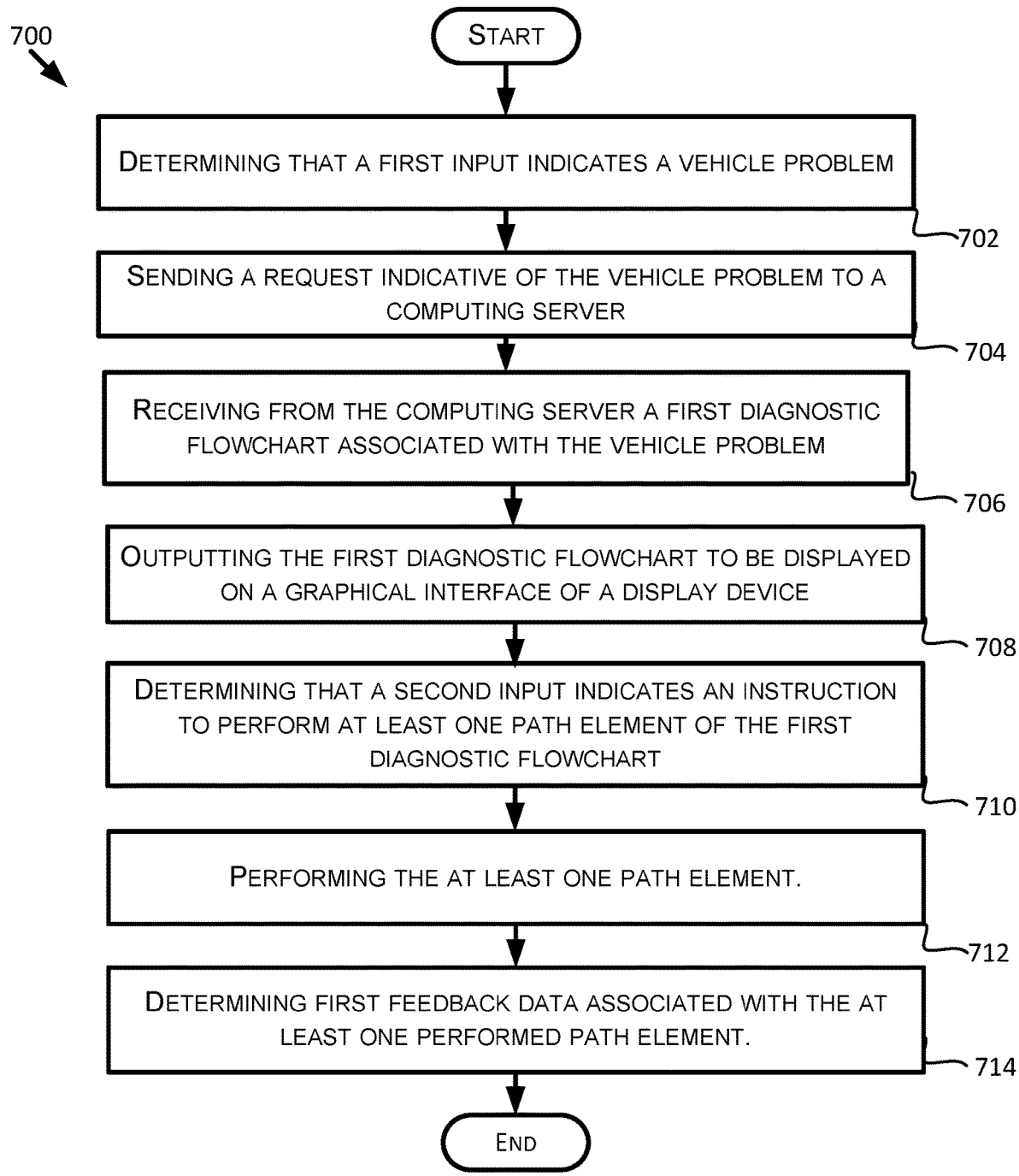
FIG. 7 shows a process chart depicting another set of functions carried out in accordance with an example embodiment.

In particular, the CRPI 220 can include program instructions executable by the processor 202 to carry out any one or more functions described herein or represented by the figures as being performed, at least in part, by the vehicle repair tool 200 or a component of the vehicle repair tool 200, or any other vehicle repair tool described herein. For example, the CRPI 220 can include program instructions to perform each of the functions or any portion described with respect to the functions of the set of functions shown in FIG. 7.

As an example, the CRPI 220 can include program instructions to cause a graphical interface to be displayed on a display of the user interface 210 of the repair tool 200. Those program instructions can be used to perform the functions described in block 702. As another example, the CRPI 220 can include program instructions to create a session list for a subject vehicle coupled to the repair tool 200. The session list may be associated with an identifier of the subject vehicle and may keep a log of all of the actions performed with respect to the subject vehicle. As another example, the CRPI 220 can include program instructions to determine a problem of a subject vehicle coupled to the repair tool 200. Determining a vehicle problem can include program instructions to request and to receive a data indicative of the vehicle problem. For example, the data indicative of the problem can be a DTC. Those program instructions can be used to perform the functions described in block 704 of FIG. 7. The CRPI 220 can also include program instructions to determine vehicle characteristics of a subject vehicle. This can include program instructions to receive at least one vehicle attribute or characteristic of the subject vehicle. The CRPI 220 can include program instructions to generate a vehicle identifier. The CRPI 220 can include program instructions to send a diagnostic flowchart request that includes a determined vehicle problem. The request can also include a vehicle identifier and data stored in the VRT data 222. Those program instructions can be executed by the processor 202 to send the server 300 a request for a diagnostic flowchart and to receive the diagnostic flowchart from the server 300. Those program instructions can also be used to perform the functions described in block 706 of FIG. 7.

As another example, the CRPI 220 can include program instructions to receive a diagnostic flowchart associated with a vehicle problem. Those program instructions can be used to perform the functions described in block 708 of FIG. 7. As another example, the CRPI 220 can include program instructions to store a received diagnostic flowchart in the CRM 214. As another example, the CRPI 220 can include program instructions to receive feedback analytics associated with a received diagnostic flowchart, and to store the received feedback analytics in the CRM 214. As another example, the CRPI 220 can include program instructions to display a diagnostic flowchart stored in the CRM 214. Those program instructions can be executed by the processor 202 to cause the content to be transmitted to a display of the user interface 210. Those program instructions can be used to perform the functions described in block 710 of FIG. 7. As another example, the CRPI 220 can include program instructions to perform a diagnostic step of a displayed diagnostic flowchart. Those program instructions can be used to perform the functions described in block 712 of FIG. 7. As another example, the CRPI 220 can include program instructions to receive feedback data associated with a displayed diagnostic flowchart, and to store the received feedback data in the CRM 214. Those program instructions can be used to perform the functions described in block 714 of FIG. 7. As another example, the CRPI 220 can include program instructions to send an instruction to an MT. As another example, the CRPI 220 can include program instructions to receive measurement data from an MT, and to store the received measurement data in the CRM 214.

The CRPI 220 can also include instructions to determine elements of the feedback data. As explained above, the elements of the feedback data can include path elements performed, decision elements selected, diagnostic steps performed, measurements performed, success of a diagnostic process, and time associated with performing elements of a flowchart. In an example, the CRPI 220 can include program instructions to determine the feedback data based on an input from a technician performing a diagnostic flowchart. The technician's input can indicate that the technician is performing or selecting an element of the feedback data. For instance, the technician can provide an input via a user interface 210 of the repair tool. For example, the input can be a selection using a mouse, a keyboard, or a touch screen. In another example, the input can be a selection using a voice command from the technician. The technician can also provide an input indicative of a measurement that the technician performed. For example, the technician can input, via a user interface 210, a voltage associated with a diagnostic step. In another example, the CRPI 220 can include program instructions to determine the feedback data based on an input received from a MT. In yet another example, the CRPI 220 can include program instructions to determine feedback data based on a VDM received from an ECU. Those program instructions can be used to perform the functions described in block 714 of FIG. 7

The technician's input can also be indicative of a modification to the diagnostic flowchart. For instance, the technician can provide an indication of a modification to the diagnostic flowchart based on a service bulletin received from a vehicle manufacturer (i.e., an original equipment manufacturer (OEM)) of vehicles or a vehicle parts manufacturer (i.e., an OEM of vehicle parts installed on a vehicle at the assembly plant of a vehicle OEM). Alternatively, the modification can be based on a service bulletin received from a diagnostic equipment manufacturer or a manufacturer of after-market vehicle parts, or a provider of vehicle service information, such as the Mitchell Repair Information Company, LLC, Poway, California. The technician's input can be indicative of a modification based on data from other sources such as other diagnostic flowcharts.

The feedback data determined by the repair tool 200 can be stored in the feedback data 218. Further, the CRPI 220 can include program instructions to implicitly determine the feedback data. For example, the repair tool can determine feedback data associated with a first element of a diagnostic flowchart from data associated with a second element of the diagnostic flowchart. For example, the technician can select a decision element that follows a specific path element. The repair tool can determine, based on the selection of the decision element, that the path element that leads to the decision element has been performed. In another example, the repair tool can determine that a specific diagnostic step has been performed based on an input of a measurement associated with the diagnostic step. For example, the CRPI 220 can include program instructions to determine the feedback data using elements of the repair tool. For example, the repair tool can use timer 208 to determine the time that it takes a technician to perform a diagnostic step, a measurement, and/or a path element.

As another example, the CRPI 220 can include instructions to determine a diagnostic process, which includes one or more diagnostic steps, of a diagnostic flowchart, that were performed. As another example, the CRPI 220 can include instructions to transmit feedback data stored in the feedback data 218 to the server 300 via the network interface 206. Those program instructions can be used to perform the functions described in block 714 of FIG. 7.

The repair tool 200 can operate within the system 100 in place of one of the repair tool 4-9, or in addition to any or each of the repair tools 4-9. One or more of the repair tools 4-9 shown in FIG. 1 can include or be arranged like the repair tool 200 or can include all or any proper subset of the components of the repair tool 200. One or more of the components of the repair tool 200 can be arranged as a device or a system. A device or system can include one or more of the components of the repair tool 200.

Figure 10:
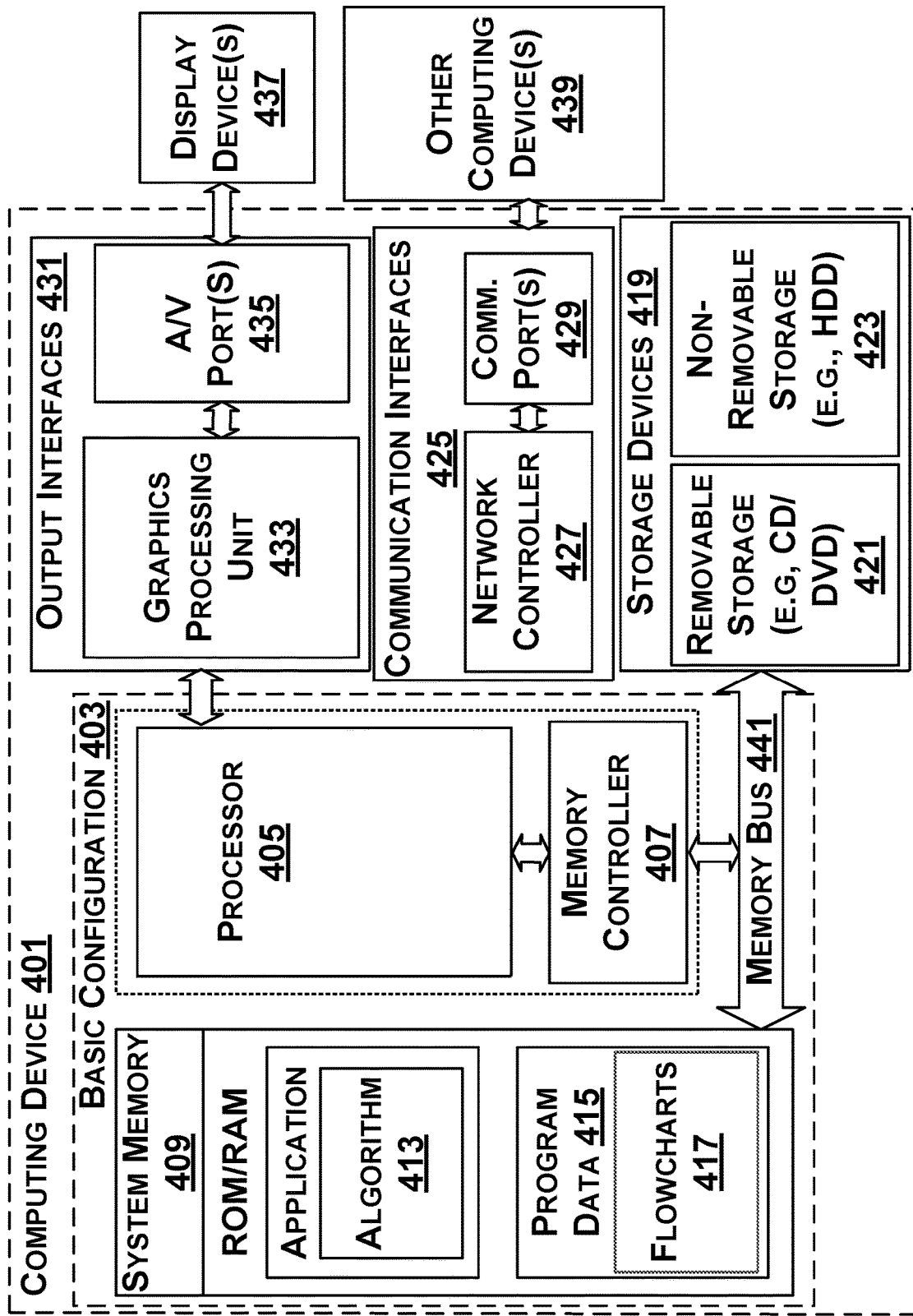
FIG. 10 is a functional block diagram illustrating an example computing device used in a computing system that is arranged in accordance with at least some example embodiment(s).

The repair tools 4, 5, and 6-9, are computing devices and can be arranged as or comprise the computing device 401 shown in FIG. 10 or any portion thereof. The CRPI 220 can be included as part of the program instructions 455 within a computer program product, such as the computer program product shown in FIG. 11.

Figure 3:
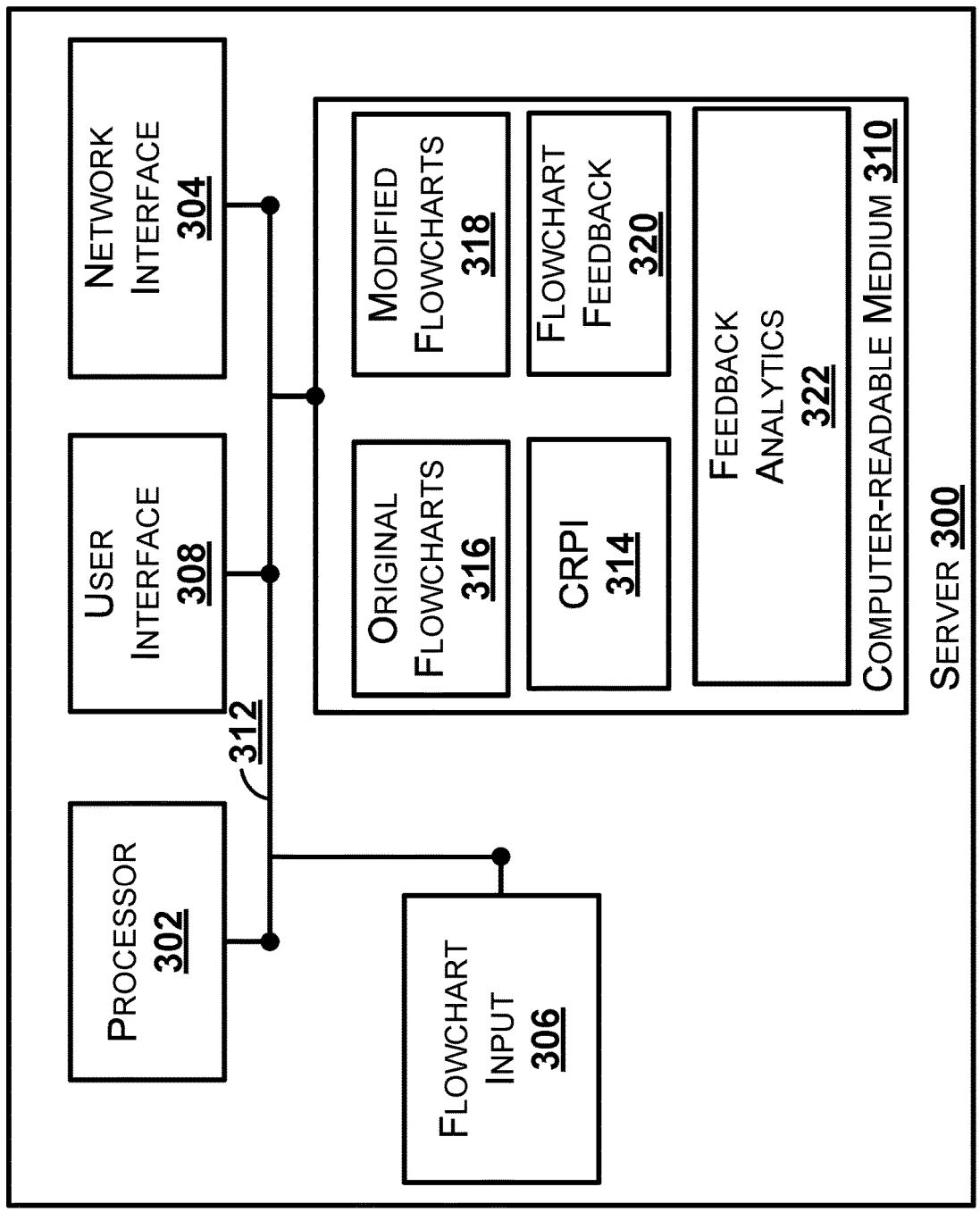
FIG. 3 is a block diagram of a server in accordance with an example embodiment.

Next, FIG. 3 is a block diagram of a server 300. The server 300 can include all of the components shown in FIG. 3 or any proper subset of the components shown within the server 300. For example, the server 300 can include a processor 302, a network interface 304, a flowchart input 306, a user interface 308, and a computer-readable medium 310. Two or more of the aforementioned components shown in FIG. 3 can be communicatively coupled or linked together via a system bus, network, or other connection mechanism 312. The server 102 shown in FIG. 1 can include, or can be configured as, the server 300. The server 102 can include all or any proper subset of the components of the server 300. Two or more of the components shown within the server 300 can be located within a single housing. Two or more of the components shown within the server 300 can be located remotely from each other in different housings or otherwise.

The network interface 304 can include one or more components for communicatively coupling the server 300 to the network 104 or to a gateway that is part of or connected to the network 104. The network interface 304 can include component(s) for wireless or wired communications via the network 104. The network interface 304 can include a modem or a network interface card. The network interface 304 can include a receiver to receive the various data described as being transmitted over the network to a server 102 or 300 or described as being received by the server 102 or 300 or the network interface 304. The network interface 304 can include a transmitter to transmit the various data described as being transmitted by the network interface 304, the processor 302, the server 300 or the various data described as being received by a server 102 or the network interface 304. The network interface 304 can include the communication interfaces 425 shown in FIG. 10 or some portion thereof.

The flowchart input 306 can include one or more components for requesting data from a database of flowcharts, and one or more components for receiving data from the flowcharts database. The flowchart database can store OEM flowcharts, after-market flowcharts, and/or other flowcharts. The flowchart input 306 can include a server-to-database communication link. The processor 302 can transmit an original flowchart request to the flowchart input 306 and over the server-to-database communication link. The flowchart input 306 can transmit the data it receives from the original flowcharts database to the processor 302.

Additionally and/or alternatively, the flowchart input 306 can include one or more devices for inputting data shown on a diagnostic flowchart into the server 300 for storage as original flowcharts 316. As an example, the flowchart input 306 can include a scanner device with or without an optical character recognition software application. As another example, the flowchart input 306 can include a keyboard for keying in (e.g., typing) the data shown on a diagnostic flowchart and sending the keyed in (e.g., typed or otherwise entered) data to processor 302 for storage as part of the original flowcharts 316. As yet another example, flowchart input 306 can include a device that accepts data storage devices, such as a CD-ROM including data representing a flowchart. As yet another example, a flowchart can be received, via the network interface 304, from a remote server. As yet another example, flowchart input 306 can include a laptop or desktop computing device with or connected to a display.

The user interface 308 can include one or more components for entering (e.g., inputting) data into the server 300 or modifying data stored in the computer-readable medium 310 or for use by the processor 302. As an example, the components of the user interface 308 can include a display screen, a user input section having one or more input keys, a pointing device such as a computing device mouse, a keyboard (e.g., a QWERTY keyboard), a display pointer (e.g. the pointing device 822 shown in FIG. 8), or a microphone for receiving spoken inputs.

Computer-readable medium 310 can store a variety of data. The data stored by computer-readable medium 310 can be data that was provided to computer-readable medium 310 for storage from the flowchart input 306, processor 302, user interface 308 or network interface 304. The data stored in the computer-readable medium 310 can include one or more of CRPI 314, original flowcharts 316, modified flowcharts 318, flowchart feedback 320, and feedback analytics 322.

The computer-readable medium 310 can include the original flowcharts 316. One or more original diagnostic flowcharts can be stored in the original flowcharts 316. An original flowchart can comprise a flowchart developed and published by a vehicle manufacturer (i.e., an original equipment manufacturer (OEM) of vehicles or a vehicle parts manufacturer (i.e., an OEM of vehicle parts installed on a vehicle at the assembly plant of a vehicle OEM. Alternatively, a diagnostic flowchart can be developed and published by a diagnostic equipment manufacturer or a manufacturer of after-market vehicle parts, or a provider of vehicle service information, such as the Mitchell Repair Information Company, LLC. These other flowcharts can be referred to as aftermarket flowcharts. An original diagnostic flowchart, which can be received from flowchart input 306, can include one or more identifiers. The identifiers can be used to easily identify or locate a flowchart during a search. The identifiers can include data associated with a flowchart. For example, the identifier can be the DTC that a flowchart is designed to diagnose. In another example, the identifier can include one or more symptoms that a flowchart is designed to diagnose. In another example, the identifiers can include a vehicle model that a flowchart is designed to diagnose. Thus, the processor 302 can use identifiers as search parameters when searching for a diagnostic flowchart in the original flowcharts 316. In another example, the processor 302 can assign a unique identifier to each diagnostic flowchart stored in the original flowcharts 316. For example, the identifier can be any numeric or alphanumeric identifier. Note, in the context of this application, original flowcharts can also be referred to as "unmodified flowcharts".

A modified flowchart can be stored in the modified flowcharts 318. A modified flowchart can be an original flowchart that has been modified based on feedback data associated with the performance of the flowchart. For example, an original flowchart can be sent to repair tool(s) multiple times. Each time that the original flowchart is sent to a repair tool, the server 300 can receive feedback associated with the performance of the diagnostic flowchart. As such, the processor 302 can generate a modified version of the original flowchart based on the received feedback. The modified flowchart can be more effective than the original flowchart in diagnosing a vehicle problem. The modified flowchart can be associated with the same identifiers with which the original flowchart is associated and/or can be associated with at least one identifier indicating the flowchart has been modified from an original flowchart. Subsequently, a request for a diagnostic flowchart associated with the DTC of the original flowchart and the modified flowchart, can result in the modified flowchart being transmitted to the repair tool. Note that a once-modified flowchart stored in the modified flowcharts 318 can also be modified to a twice-modified flowchart based on the feedback associated with the once-modified flowchart. A diagnostic flowchart can be modified any number of times.

In some examples, more than one modified version of a diagnostic flowchart can exist. As explained above, a repair tool can be associated with a geographic region. The server 102 can receive different feedback data for the same flowchart from repair tools located in different regions. For example, this can be attributed to a disparity in weather conditions between different geographic regions. Thus, the processor 302 can generate a different modified version of the flowchart for different geographic regions. The server 300 can also determine the location of the repair tool that provides diagnostic feedback data to the server. As an example, the server 300 can determine the location of the repair tool from the location information included within a diagnostic flowchart request. In another respect, the request can include an identifier of the repair tool. The server 300 can store data that associates the repair tool identifier with a location of the repair tool. As another example, the server 300 can use an IP address within a diagnostic flowchart request to determine the location of the repair tool. As yet another example, the server 300 may determine the location of the tool based on who owned the tool and/or the owner's work location.

The processor 302 can analyze feedback data to generate feedback analytics that can be stored in feedback analytics 322. Each diagnostic flowchart stored in the CRM 310 can be associated with respective analytical data. The analytical data associated with a diagnostic flowchart can include a selection statistic for one or more path elements and/or decision elements of the diagnostic flowchart. The selection statistic can represent the number of times that an element of the diagnostic flowchart was selected during performances of the diagnostic flowchart. The analytical data can also include data indicative of the success rate of a diagnostic process. The success rate can be indicative of the success of a diagnostic flowchart in diagnosing a vehicle problem.

The computer-readable medium 310 can include CRPI 314. The processor 302 can execute the CRPI 314. The CRPI 314 can include program instructions to perform any function described herein as being performed by a server, such as the server 102 or the server 300, or by any component described herein as being a component of a server. For example, the CRPI 314 can include program instructions to perform each of the functions or any portion described with respect to the functions of the set of functions shown in FIG. 6.

As another example, the CRPI 314 can include program instructions executable by the processor 302 to receive a request from one or more repair tools 200. The one or more repair tools can be configured to determine a vehicle problem. A request received by the server 300 can include data indicative of the vehicle problem. The data can indicate a DTC indicative of a vehicle problem, a vehicle part that is experiencing the problem, and a symptom of the problem. The request can additionally include a vehicle identifier the subject vehicle. The processor 302, in response to receiving the request, can execute the CRPI 314 to search for a diagnostic flowchart associated with the vehicle problem and/or vehicle characteristics. Additionally and/or alternatively, the diagnostic flowchart can be associated with the vehicle characteristics of the vehicle. The CRPI 314 can include program instructions to determine which diagnostic flowchart is associated with the vehicle problem and the vehicle characteristics. Those program instructions can be executed by the processor 302 to search the computer-readable medium 310 for a diagnostic flowchart and to receive the diagnostic flowchart from the computer-readable medium 310.

The CRPI 314 can include program instructions executable by the processor 302 to send the selected diagnostic flowchart to the repair tool 200 from which the request was received. Those program instructions can be executed by the processor 302 to cause the network interface 304 to send the diagnostic flowchart to the repair tool (e.g., repair tool 200). The CRPI 314 can include program instructions to receive feedback data associated with the diagnostic flowchart that it sent to the repair tool. The CRPI 314 can include program instructions to save the flowchart feedback data in the computer-readable medium 310 as flowchart feedback 320. The CRPI 314 can include program instructions to analyze the flowchart feedback 320 to generate feedback analytics.

As an example, feedback analytics can include statistical data indicative of the number of times that a specific element of a diagnostic flowchart was selected or performed. As another example, the statistical data can also be indicative of a success rate of a diagnostic process of a diagnostic flowchart. The CRPI 314 can include program instructions to store the feedback analytics as feedback analytics 322 in computer-readable medium 310. The processor 302 can aggregate feedback data based on multiple instances of performing a flowchart to develop the feedback analytics for that flowchart.

Figure 4:
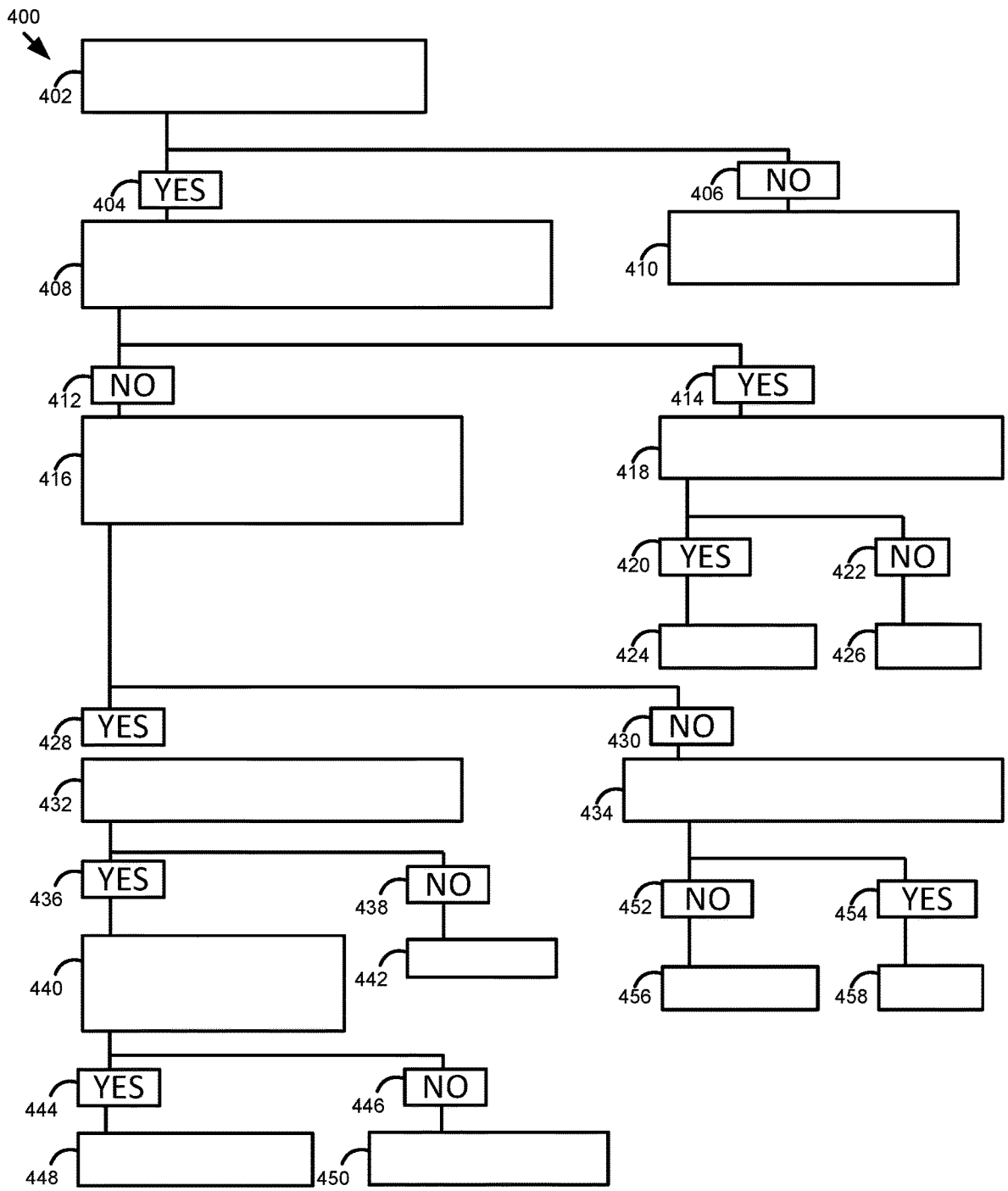
FIG. 4 shows a diagnostic flowchart in accordance with an example embodiment.

As still yet another example, the CRPI 314 can include program instructions executable by the processor 302 to modify a diagnostic flowchart, such as diagnostic flowchart 400 illustrated in FIG. 4. The server 300 can use the flowchart feedback 320 and/or the feedback analytics 322 as a basis to modify the diagnostic flowchart. Modifying a diagnostic flowchart can include generating a modified diagnostic flowchart based on the first diagnostic flowchart. As an example, the order of the elements in the modified diagnostic flowchart can be different than the order of the elements in the first diagnostic flowchart. As another example, the number of elements in the modified diagnostic flowchart can be different than the number of elements in the first diagnostic flowchart. As yet another example, the diagnostic steps of a path element of the modified diagnostic flowchart can be different than the diagnostic steps of a corresponding path element in the first diagnostic flowchart.

The server 102 and the server 300 are computing devices and can be arranged as or comprise the computing device 401 shown in FIG. 10 or any portion thereof. The CRPI 314 can be included as part of the program instructions 455 within a computer program product, such as the computer program product shown in FIG. 11. Accordingly, a server can also be referred to as a computer server or a computing server.

III. Example Diagnostic Flowcharts

As explained above, a server 300 can store diagnostic flowcharts. A diagnostic flowchart stored within original flowcharts 316 and/or modified flowcharts 318 can include searchable text or symbols (e.g., text, symbols, or text and symbols). A diagnostic flowchart can be associated with a vehicle problem or a symptom of the vehicle problem (e.g., faults (perceived or real) complaints, DTC, etc.). For example, a diagnostic flowchart can be associated with a DTC.

As described above, a diagnostic flowchart is a flowchart that can include diagnostic processes for diagnosing a vehicle problem. As an example, a diagnostic flowchart can be a decision tree that includes path elements and decision elements that make up the diagnostic processes. The order in which the elements are arranged can indicate an order in which they can be performed. As also explained above, the first element of a diagnostic flowchart is a path element. The order in which the steps of a path element are arranged can indicate the order in which the steps can be performed. For example, a path element can include three diagnostic steps that can be performed in an order in which they are arranged. A path element can also include a prompt associated with the diagnostic steps of the path element. For example, the prompt can be an inquiry regarding the result of one or more of the diagnostic steps of the path element. Selecting a decision element, from the decision elements that a path element leads to, can indicate the response to the prompt of the path element.

As an example, consider a path element that includes a prompt "Is more than 0.5 V present?" More than one decision element can lead from the path element, where each decision element can lead to a different path element. As an example, a first decision element that leads from the first path element to a second path element can be indicative of a "YES." Selecting a decision element indicative of "YES" can indicate that there is more than 0.5 V present. A second decision element can link between the first path element and a third path element. The second decision element that leads from the first path element to the third path element can be indicative of a "NO." Selecting a decision element indicative of "NO" can indicate that there is not more than 0.5 V present. Other examples of decision elements can be possible. For instance, a path element, which includes a prompt associated with a voltage, can lead to more than one decision element, where each decision element is indicative of a voltage range. As such, the next path element performed can depend on the decision element selected in response to a prompt.

A repair tool or a user of the repair tool (e.g. technician) can perform a diagnostic flowchart by starting at the first path element. After performing the diagnostic steps of the path element, the repair tool or the user can select a decision element that lead from the path element. This process of performing the diagnostic steps of a path element and selecting a decision element in response to a prompt of the path element is repeated until a final path element is reached. Performing the diagnostic steps of the final path elements can result in a diagnosis of the vehicle problem. A diagnostic flowchart can include more than one final path element. Thus, a diagnostic flowchart can include more than one diagnostic process, where each diagnostic process includes the path elements performed and the decision elements selected to reach the final path element from the first path element. The final path element can also include a prompt that is associated with the diagnosis of the vehicle in order to determine whether the diagnostic process was successful in diagnosing the vehicle problem.

FIG. 4 illustrates a diagnostic flowchart 400, according to an example embodiment. The diagnostic flowchart 400 can include decision elements 404, 406, 412, 414, 420, 422, 428, 430, 426, 438, 444, 446, 452, and 454. Additionally, the diagnostic flowchart can include path elements 402, 408, 410, 416, 418, 424, 426, 432, 434, 440, 442, 448, 450, 456, and 458. As illustrated, each decision element can lead to one or more path elements.

The diagnostic flowchart 400 can be associated with a vehicle problem or a symptom of a vehicle problem. Further, the diagnostic flowchart 400 can be associated with a vehicle model or and/or a specific car part. In an example, the diagnostic flowchart can be associated with a DTC. For instance, the diagnostic flowchart 400 can be associated with DTC 41. DTC 41 can be indicative of a problem with the ignition control (IC) circuit. Accordingly, the diagnostic flowchart 400 can include one or more diagnostic processes to diagnose the problem with the IC circuit.

A path element (i.e. path element 402) of a diagnostic flowchart 400 can include a diagnostic step. A diagnostic step can be performed by a technician responsible for the repair of the subject vehicle. Additionally and/or alternatively, a diagnostic step can be performed by a repair tool. The diagnostic step can also be performed by a measurement tool. After completing the steps of a path element, the flowchart can lead to a decision element that is indicative of a response to a prompt of the path element. The response to the prompt can depend on a measurement made or on a property determined in a path element that leads to the decision element. In some examples, the prompt can require an answer from a technician. The technician can indicate the response by selecting a decision element. In another example, the technician can provide a response, such as a measurement, to the prompt. A decision element can be selected based on the response provided by the technician.

As illustrated in FIG. 4, path element 402 is the first path element of the diagnostic flowchart 400. The path element 402 can include one or more diagnostic steps. For example, the path element can include two diagnostic steps: 1) Clear DTC(s) 2) Crank engine for 15 seconds. The path element 402 can also include a prompt: "Does the DTC 41 set?" The next path element in the diagnostic process can depend on the decision element chosen in response to the prompt of path element 402.

If the decision element 406 (i.e. "NO") is chosen, the next path element in the diagnostic process can be path element 410. Path element 410 can include the diagnostic step: "DTC 41 is intermittent. Refer to "diagnostic aids"." Further, path element 410 can be a final path element in a diagnostic process. For example, a diagnostic process can include path element 402, decision element 406, and path element 410. In such an example, path element 402 can be the first path element and path element 410 can be the final path element of the diagnostic process.

Alternatively, if the decision element 404 (i.e. "YES") is chosen, the next path element in the diagnostic process can be path element 408. Path element 408 can include four diagnostic steps: "1) Ignition "off." 2) Disconnect ignition coil module connector. 3) Probe ignition coil module harness connector terminal "B" with a voltmeter to ground. 4) Ignition "on."" The path element 408 can also include a prompt: "Is more than 0.5 volts present?" The next path element in the diagnostic process can depend on the decision element chosen in response to the prompt of path element 408. If the decision element 414 (i.e. "YES") is chosen, the next path element in the diagnostic process can be path element 418. Alternatively, if the decision element 412 (i.e. "NO") is chosen, the next path element in the diagnostic process can be path element 416.

Path element 418 can include three diagnostic steps: "1) Ignition "off " 2) Disconnect ECM connector "A". 3) Ignition "on."" The path element 418 can also include a prompt: "Is there a voltage present?" The next path element in the diagnostic process can depend on the decision element chosen in response to the prompt of path element 418. If the decision element 420 (i.e. "YES") is chosen, the next path element in the diagnostic process can be path element 424. Alternatively, if the decision element 422 (i.e. "NO") is chosen, the next path element in the diagnostic process can be path element 426.

Path element 424 can include a single diagnostic step: "1) Short to voltage in IC circuit." Path element 424 can also be a final path element in a diagnostic process. Such a diagnostic process can include the path elements 402, 408, 418, and 424. The diagnostic process can also include the decision elements 404, 414, and 420.

Returning to path element 418, if the decision element 422 (i.e. "NO") is chosen in response to the prompt question of the path element 418, the next path element in the diagnostic process can be the path element 426. Path element 426 can include a single diagnostic step: "1) Faulty ECM." Path element 426 can also be a final path element in a diagnostic process. Such a diagnostic process can include path elements 402, 408, 418, and 426. The diagnostic process can also include decision elements 404, 414, and 422.

Returning to path element 408, if the decision element 412 (i.e. "NO") is chosen, the next path element in the diagnostic process can be path element 416. Path element 416 can include a single diagnostic step: "1) With voltmeter on AC scale, crank engine and observe voltage." The path element 416 can also include a prompt: "Is voltage between 1 and 4 volts?" The next path element in the diagnostic process can depend on the decision element chosen in response to the prompt of path element 416. If the decision element 428 (i.e. "YES") is chosen, the next path element in the diagnostic process can be path element 432. Alternatively, if the decision element 430 (i.e. "NO") is chosen, the next path element in the diagnostic process can be path element 434.

Path element 434 can include three diagnostic steps: "1) Ignition "off" 2) Disconnect ECM connector "A". 3) Check for continuity between ECM connector terminal "A12" and ignition coil module connector terminal "B"." The path element 434 can also include a prompt: "Is the circuit open?" The next path element in the diagnostic process can depend on the decision element chosen in response to the prompt of path element 434. If the decision element 452 (i.e. "NO") is chosen, the next path element in the diagnostic process can be path element 456. Alternatively, if the decision element 454 (i.e. "YES") is chosen, the next path element in the diagnostic process can be path element 458.

Path element 456 can include a single diagnostic step: "1) Faulty ECM connection or faulty ECM." Path element 456 can also be a final path element in a diagnostic process. Such a diagnostic process can include the path elements 402, 408, 416, 434, and 456. The diagnostic process can also include the decision elements 404, 412, 430 and 452.

Path element 458 can include a single diagnostic step: "1) Open IC circuit between ECM and ignition coil module." Path element 458 can also be a final path element in a diagnostic process. Such a diagnostic process can include the path elements 402, 408, 416, 434, and 458. The diagnostic process can also include decision elements 404, 412, 430 and 454.

Returning to path element 416, if the decision element 428 (i.e. "YES") is chosen, the next path element in the diagnostic process can be path element 432. Path element can include two diagnostic steps: "1) Ignition "off." 2) With test light to B+, probe ignition could module harness connector terminal "C." Light should be on." The path element 428 can also include a prompt: "Is the light on?" The next path element in the diagnostic process can depend on the decision element chosen in response to the prompt of path element 432. If the decision element 436 (i.e. "YES") is chosen, the next path element in the diagnostic process can be path element 440. Alternatively, if the decision element 438 (i.e. "NO") is chosen, the next path element in the diagnostic process can be path element 442.

Path element 442 can include a single diagnostic step: "1) Open ignition coil module ground circuit." Path element 442 can also be a final path element in a diagnostic process. Such a diagnostic process can include path elements 402, 408, 416, 432, and 442. The diagnostic process can also include decision elements 404, 412, 428 and 438.

Path element 440 can include two diagnostic steps: "1) Ignition "on." 2) With test light to ground, probe ignition coil module harness connector terminals "D" and "A." Light should be on both." The path element 440 can also include a prompt: "1) Is the light on both?" The next path element in the diagnostic process can depend on the decision element chosen in response to the prompt of path element 440. If the decision element 444 (i.e. "YES") is chosen, the next path element in the diagnostic process can be path element 448. Alternatively, if the decision element 446 (i.e. "NO") is chosen, the next path element in the diagnostic process can be path element 450.

Path element 450 can include a single diagnostic step: "1) Faulty circuit from ignition coil to ignition coil module on circuit that did not light." Path element 450 can also be a final path element in a diagnostic process. Such a diagnostic process can include the path elements 402, 408, 416, 432, 440, and 450. The diagnostic process can also include decision elements 404, 412, 428, 436, and 446.

Path element 448 can include a single diagnostic step: "1) Faulty ignition coil module connection or faulty ignition module." Path element 448 can also be a final path element in a diagnostic process. In such an example, the diagnostic process can include path elements 402, 408, 416, 432, 440, and 448. The diagnostic process also can also include the decision elements 404, 412, 428, 436, and 444.

A diagnostic flowchart 400 can include identifiers that can be used to identify the diagnostic flowchart. For example, the diagnostic flowchart 400 can include a manufacturer identifier, an identifier of a vehicle problem (e.g., faults (perceived or real) complaints, DTC, etc.), and/or an identifier of a vehicle model and/or part. A diagnostic flowchart 400 can also include information indicative of a geographic region with which the diagnostic flowchart 400 can be associated.

Note that the example provided in FIG. 4 and the accompanying description herein is for illustrative purposes only and should not be considered limiting. For example, a diagnostic flowchart can be associated with any DTC and/or vehicle problem/symptom. As another example, the number of path elements and decision elements in a diagnostic flowchart can be less than or greater than the number of path elements and decision elements illustrated in FIG. 4. As yet another example, the description of the diagnostic flowchart 400 includes examples of some diagnostic processes that are included in the diagnostic flowchart 400. The diagnostic flowchart 400 can include other diagnostic processes. For example, a diagnostic process can include path elements and decision elements of diagnostic flowchart 400 that are chosen in a different order than the order in which the path elements of the diagnostic processes described herein are chosen.

In one respect, the diagnostic flowchart 400 can comprise an original diagnostic flowchart, such as an original diagnostic flowchart stored in the original flowcharts 316. In another respect, the diagnostic flowchart 400 can comprise a modified diagnostic flowchart, such as a diagnostic flowchart stored in the modified flowcharts 318.

The diagnostic flowchart 400 can be a computer-readable diagnostic flowchart. The computer-readable diagnostic flowchart can be arranged as a structured query language (SQL) file, an extensible markup language (XML) file, or some other type of computer-readable file or data structure. Accordingly, a processor, such as processor 302 can search the text, symbols or other content on a diagnostic flowchart 400. Further, a diagnostic flowchart 400 can be displayed on a display of a user interface 210 of a repair tool 200.

Figure 5A:
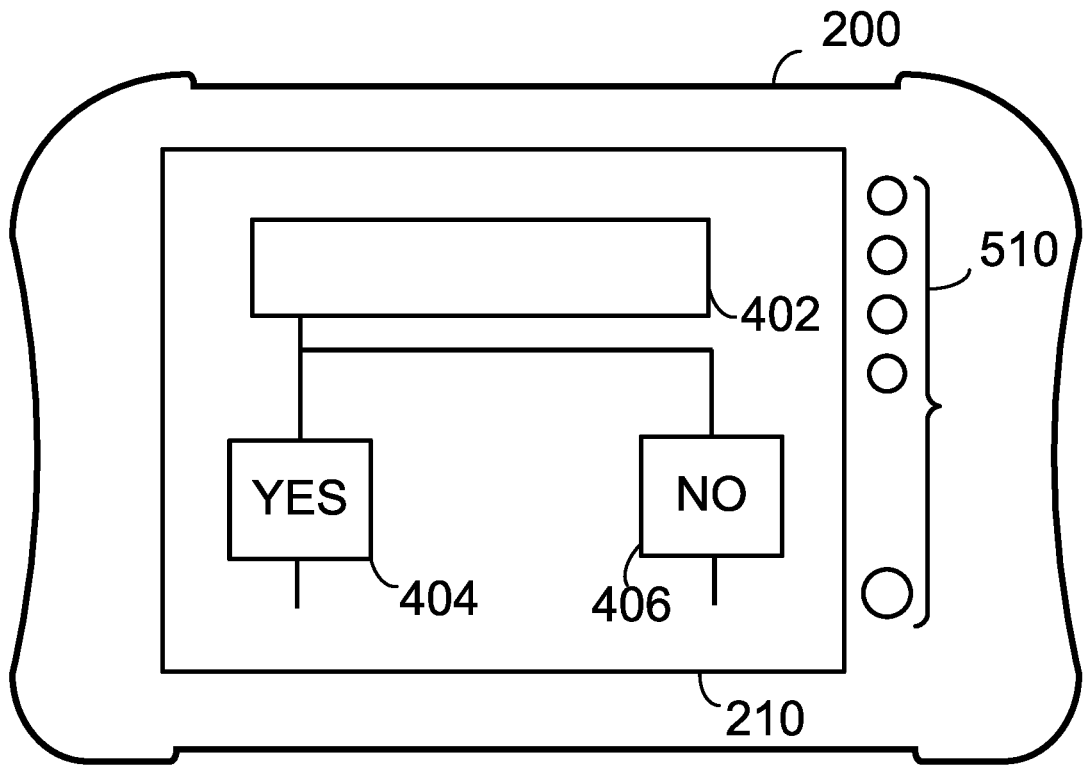
FIGS. 5A and 5B show a repair tool displaying at least a portion of a diagnostic flowchart in accordance with an example embodiment.
Figure 5B:
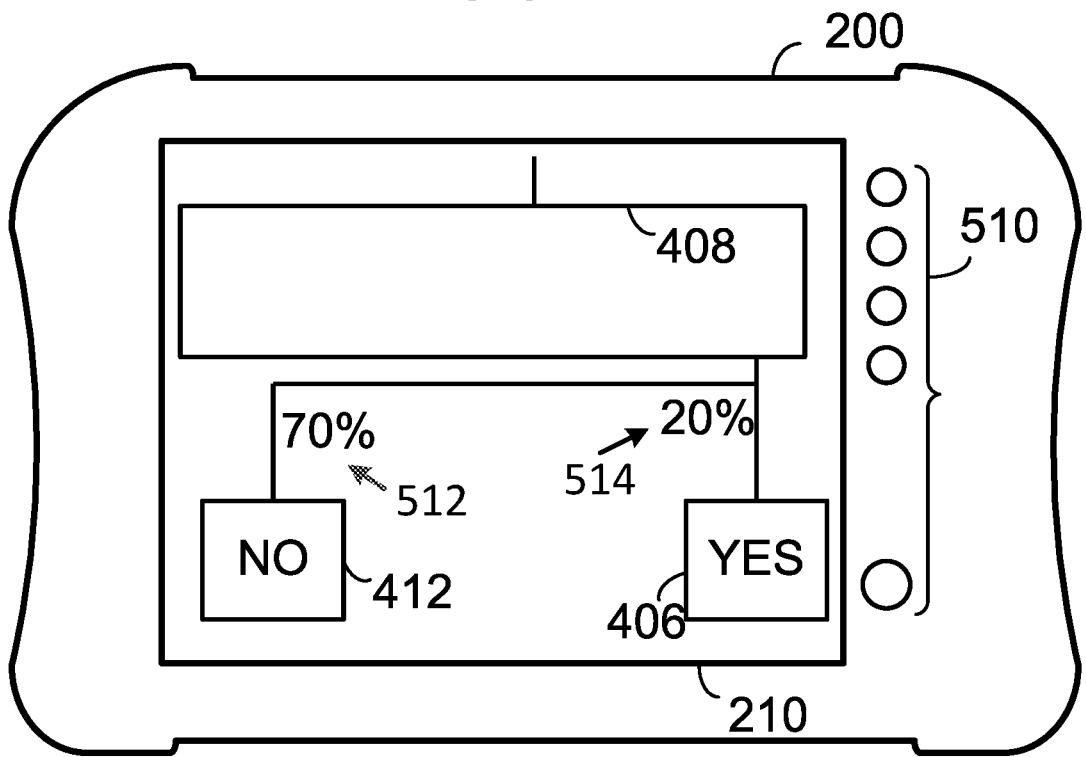

FIG. 5A illustrates a repair tool 200 displaying a first portion of a diagnostic flowchart 400. FIG. 5B illustrates a repair tool 200 displaying a second portion of a diagnostic flowchart 400. The user input section 510 can include input keys. Those user input keys can be arranged in any of a variety of configurations. For instance, an input key can represent an up-direction selection, a right-direction selection, a down-direction selection, a left-direction selection, or an enter selection. Pressing one of the input keys can cause a display pointer to move in a direction represented by the input key being pressed. Pressing the input key can cause selection of a displayed data element to which the display pointer is pointing.

In another embodiment, the repair tool 200 can display more than one diagnostic flowchart 400 side-by-side. For example, the repair tool 200 can display a modified diagnostic flowchart. Additionally, the repair tool 200 can display an original flowchart, on which the modified diagnostic flowchart is based, beside the modified diagnostic flowchart. In some examples, the repair tool 200 can display a first portion of the modified diagnostic flowchart and the original diagnostic flowchart side-by-side.

IV. Example Operation

Figure 6:
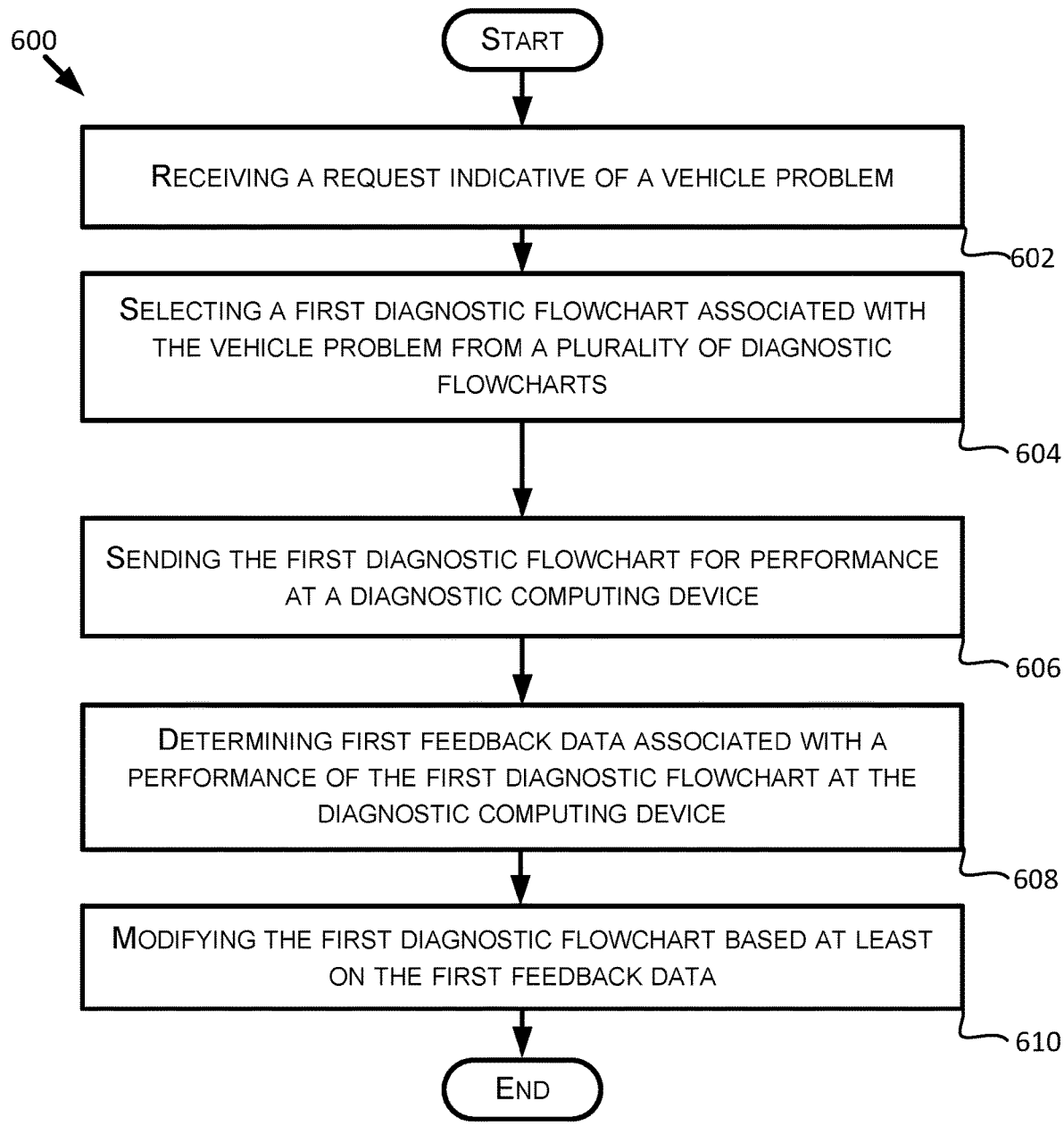
FIG. 6 shows a process chart depicting a set of functions that can be carried out in accordance with an example embodiment.

Next, FIG. 6 shows a process chart depicting a set of functions 600 (or more simply "the set 600") that can be carried out in accordance with the example embodiments described in this description. The set 600 includes the functions shown in blocks labeled with even numbers 602 through 610 inclusive. The following description of the set 600 includes references to elements shown in other figures described in this description, but the functions of the set 600 are not limited to being carried out only by the referenced elements. A variety of methods can be performed using all of the functions shown in the set 600 or any proper subset of the functions shown in the set 600. Any of those methods can be performed with other functions such as one or more of the other functions described in this description. One or more of the functions shown in the set 600 can be carried out multiple times in performing a method in accordance with the example embodiments. Further, the set 600 is described as carried out by a server communicating with one repair tool, but the functions of the set 600 can be carried out one or more servers communicating with a plurality of repair tools.

Block 602 includes receiving a request indicative of a vehicle problem. For example, the server 102 can receive a request indicative of a vehicle problem from a repair tool that can be diagnosing a vehicle with the vehicle problem. As an example, the request can be transmitted from the repair tool 4, which can be coupled to and diagnosing vehicle 1. The repair tool 4 can generate the request in response to detecting a vehicle problem with vehicle 1. The repair tool 4 can detect the vehicle problem or a symptom of the problem by receiving an input indicative of the vehicle problem from a user (e.g., technician) of the repair tool 1. In an example, the repair tool 4 can receive the input indicative of the vehicle problem from the technician via its user interface 210. The input can include details such as "vehicle systems" (e.g., brakes, transmission, engine, entertainment, steering, suspension, etc.), vehicle components (e.g., brake caliper, brake shoe, brake pad, bleeder screw, brake line, etc.), vehicle symptoms (e.g., faults (perceived or real), complaints, etc.), spatial qualifiers (e.g., left front, right rear, front, inside, outside, passenger compartment, under-hood, etc.), tests and results (e.g., voltage test and voltage high, resistance test and open circuit, resistance test and short circuit, etc.), and/or DTC identifiers (e.g., P0401, P1115, etc.), to describe the problem. In another example, the repair tool 4 can detect the problem by sending a DTC request to the ECU of vehicle 1. The ECU can transmit a VDM to the repair tool 4 in response to the DTC request. The VDM data can include one or more DTCs stored in the ECU.

The request transmitted from the repair tool 4 to the server 102 can be a request for a diagnostic flowchart. The request can include the data indicative of the vehicle problem as specified by the technician and/or as received from the ECU. The request can also include additional data. For example, the request can include a vehicle identifier. The diagnostic flowchart request can also include data stored in the VRT data 222. For example, the diagnostic flowchart request can include geographic data indicative of the location of the repair tool 4. In some examples, the request cannot explicitly include the location of the repair tool. Thus, the server 102 can determine the location of the repair tool from which the diagnostic flowchart was received. As an example, the request can include an identifier of the repair tool. Accordingly, the server 102 can determine the location of the repair tool based on the identifier of the repair tool and a location the server previously associated with the identifier. As another example, the server 102 can use an IP address of the repair tool to determine the geographic location of the repair tool. The diagnostic flowchart request can also include other data specified by the technician and/or by the repair tool 4.

Next, block 604 includes selecting a first diagnostic flowchart associated with the vehicle problem from a plurality of diagnostic flowcharts. The processor 302 of the server 102 can execute the CRPI 314 instructions to select a diagnostic flowchart from the plurality of diagnostic flowcharts stored in the CRM 310. Selecting the diagnostic flowchart can include searching for a diagnostic flowchart that can be performed to diagnose the vehicle problem specified by the diagnostic flowchart request. More specifically, the processor 302 can use the data included in the diagnostic flowchart request as search parameters to search for a diagnostic flowchart that can be performed to diagnose the vehicle problem.

In an example, the processor 302 can use the DTC included in the diagnostic flowchart request as a first search parameter. The processor 302 can search the CRM 310 for flowcharts associated with the DTC. For example, the processor 302 can search for diagnostic flowcharts associated with DTC 41. The processor 302 can search the original flowcharts 316 and the modified flowcharts 318 for a diagnostic flowchart associated with the DTC 41. In an example, the search can result in a single diagnostic flowchart located in original flowcharts 316. The processor 302 can select the diagnostic flowchart resulting from the search. As such, if the search results in only an original diagnostic flowchart, the processor 302 can select that original flowchart.

In some examples, however, the DTC association search results can include more than one diagnostic flowchart. In such examples, the processor 302 can use more than one search parameter to search for a diagnostic flowchart. In an example, the processor 302 can use the modification date of a diagnostic flowchart as a search parameter. For example, the processor 302 can search for the most recently modified diagnostic flowchart associated with the DTC 41. In another example, the processor 302 can use data other than the DTC (e.g., a vehicle identifier) as a search parameter. For example, the processor 302 can search for a diagnostic flowchart associated with the DTC 41 and the model of vehicle 1. In another example, the processor 302 can search for the most recently modified diagnostic flowchart associated with the DTC 41 and the model of vehicle 1. The processor 302 can also use the geographic location of a repair tool as a search parameter. In yet another example, the processor 302 can search for a diagnostic flowchart associated with the DTC 41 and the geographic location of the repair tool 4. In yet another example, the processor 302 can search for the most recently modified diagnostic flowchart associated with the DTC 41 and the geographic location of the repair tool 4. In yet another example, the processor 302 can search for a diagnostic flowchart associated with the DTC 41, the model of vehicle 1, and the geographic location of the repair tool 4. In yet another example, the processor 302 can search for the most recently modified diagnostic flowchart associated with the DTC 41, the vehicle 1 model, and the geographic location of the repair tool 4. Other search parameters and searches are also possible.

The processor 302 can execute the CRPI 314 instructions to search for a diagnostic flowchart using any search parameters such that the search results in a single diagnostic flowchart, such as diagnostic flowchart 400. The processor 302 can select the diagnostic flowchart 400. In some examples, the technician can request more than one diagnostic flowchart associated with the DTC. For example, the technician can request the most recently modified diagnostic flowchart associated with the DTC 41 and the original diagnostic flowchart associated with the DTC 41. In another example, the technician can request a first diagnostic flowchart associated with the DTC 41 and a first geographic region and a second diagnostic flowchart associated with the DTC 41 and a second geographic region. In some examples, the search cannot locate a diagnostic flowchart associated with the search parameters. In such an example, the processor 302 can send a notice the repair tool 4 that the requested flowchart is not available.

Next, block 606 includes sending the first diagnostic flowchart for performance at a diagnostic computing device. For example, the diagnostic computing device can be the repair tool 4. The processor 302 can execute the CRPI 314 instructions to send the diagnostic flowchart 400 to the repair tool 4. Those program instructions can include instructions to cause the network interface 304 to send the flowchart 400 to the repair tool 4. In some examples, the program instructions can include instructions to cause the network interface 304 to send the analytical data associated with the flowchart 400 (stored in feedback analytics 322) to the repair tool 4.

The repair tool 4 can receive the flowchart 400 from the server 102. The repair tool 4 can store the flowchart 400 in the diagnostic flowchart 216. The repair tool 4 can also receive the feedback analytics associated with the flowchart 400 and can store the feedback analytics in the feedback analytics 226. Further, as illustrated in FIG. 5A and FIG. 5B, the repair tool 4 can display the diagnostic flowchart 400 on its display. Also, as illustrated in FIG. 5B, the feedback analytics 512 and 514 can be displayed on the display with the diagnostic flowchart 400 and in proximity of the elements with which the feedback analytics are associated (e.g., decision elements 412 and 414, respectively). Other decision elements in the flowchart 400 may be associated with feedback analytics such that the sum of percentages associated with final path elements equals one hundred percent. The technician can be able to perform a diagnostic process of the displayed flowchart 400 to diagnose the problem with vehicle 1. The technician can also provide instructions to the repair tool 4 that cause the repair tool 4 to perform diagnostic steps of the diagnostic flowchart 400. The diagnostic steps of a diagnostic flowchart can include diagnostic steps that can be performed by a technician, a repair tool, and/or a measurement tool. Performing the diagnostic flowchart 400 can also include selecting decision elements of the flowchart in order to make decisions in the diagnostic process, such as decisions in response to the prompts of a path element.

The repair tool 4 can store data indicative of the path elements performed and of the decision elements selected of a displayed diagnostic flowchart. In an example, and as illustrated in FIG. 5A, the repair tool 4 can display a first portion of the diagnostic flowchart 400. In this example, path element 402 and decision elements 404 and 406 are displayed on the display of the repair tool 4. The path element 402 can include two diagnostic steps: "1) Clear DTC(s) 2) Crank engine for 15 seconds." Accordingly, the repair tool 4 can send an instruction to the ECU of the vehicle 1 to clear the DTC. The repair tool 4 can also send an instruction to the ECU of the vehicle 1 to crank vehicle 1's engine for 15 seconds. Alternatively, the technician can crank the engine. Path element 402 also includes the prompt: "Does the DTC 41 set?" Accordingly, the repair tool 4 can send a DTC request to the ECU of vehicle 1. The repair tool 4 can then receive the DTC and can determine whether the DTC 41 was set. Alternatively, the repair tool 4 can display the response from the ECU on the display. The technician can then determine whether the DTC 41 was set. If the DTC 41 was set, the repair tool 4 or the technician can select decision element 404, which can be indicative of "YES." Alternatively, if the DTC 41 was not set, the repair tool 4 or the technician can select the decision element 406. As explained above, the next path element in a diagnostic process can depend on a decision element selected in response to a prompt of a path element. In this example, the decision element 404 is selected, which can be indicative of "NO." Accordingly, the next path element in the diagnostic process can be the path element 408. Further, the repair tool 4 can store data, in the feedback data 218, indicative of the two diagnostic steps of path element 402 that were performed. The repair tool 4 can store data, in the feedback data 218, indicating that the decision element 404 was selected.

The repair tool 4 can also store data indicative of measurements that were made when performing a diagnostic step that includes a measurement step. For example, path element 408 includes four diagnostic steps: "1) Ignition "off." 2) Disconnect ignition coil module connector. 3) Probe ignition coil module harness connector terminal "B" with a voltmeter to ground. 4) Ignition "on."" The path element 408 also includes a prompt: "Is more than 0.5 volts present?" In order to select a decision element (i.e., decision element 412 or 414) in response to the prompt, a measurement needs to be performed. In this example, the voltage measurement can be performed using a voltmeter. The technician can perform the measurement step using the MT 900 that can be a digital volt ohm meter (DVOM). The technician can enter the measurement value into an appropriate field in the displayed graphical interface of the repair tool 4. The repair tool 4 can store the measurement in the feedback data 218. Alternatively, the MT 900 can transmit the measurement value to the repair tool 4, which can store the measurement value in the feedback data 218. The repair tool 4 can use the measurement value to select a decision element in response to the prompt. Alternatively, the technician can select the decision element via an input to the user interface 210. In another example, the technician can perform the measurement and select a decision element without entering the measurement value into the repair tool 4. The repair tool 4 can determine the measured voltage from the decision element that is selected by the technician and can store the determined measurement in feedback data 218. For example, the repair tool 4 can determine that the voltage is less than 0.5 V if the decision element 406 is selected. Alternatively, the repair tool 4 can determine that the voltage is greater than 0.5V if the decision element 404 is selected.

As mentioned above, the repair tool 4 can store data indicative of the path elements that are performed during a diagnostic process. The repair tool 4 can determine the path elements performed based on the technician's inputs. In an embodiment, the technician can select a path element from the diagnostic flowchart 400 displayed on the display of the repair tool 4. For example, the technician can select the path element 408, which indicates that the technician will perform the diagnostic steps of the path element 408. The repair tool 4 can store data indicative of the technician's selection in the feedback data 218. In another embodiment, the technician can perform a diagnostic step of a path element without selecting the path element. However, the technician can input a measurement value into a field dedicated to the measurement value of the diagnostic step. Accordingly, the repair tool 4 can determine that the technician performed that diagnostic step. For example, the technician can perform the diagnostic steps of path element 408 without selecting the path element 408 via an input to the user interface 210 of the repair tool 4. However, when the technician inputs the measured voltage value into a field dedicated to the measurement value of the diagnostic step from path element 408, the repair tool 4 can determine that the technician performed the path element 408. The repair tool 4 can store data indicative of the path element performed and of the measurement value in the feedback data 218. In yet another embodiment, the repair tool 1 can determine the path elements performed based on a selection of a decision element. For example, if the technician selects the decision element 412, without previously selecting the path element, the repair tool 4 can determine that the path element 408 was performed. Further, based on the selection of the decision element 412, the repair tool 4 can determine that the voltage measured when performing the diagnostic steps of the path element 408 was less than 0.5 V. The repair tool 4 can store data indicative of the path element performed, the decision element selected, and the measurement in the feedback data 218.

The repair tool 4 can also store data indicative of the decision elements selected during a performance of the diagnostic flowchart 400. The repair tool 4 can determine the decision element selected based on an input from the technician. In an embodiment, the technician can select a decision element from the decision elements displayed on a display of the repair tool 4. For example, the technician can select the decision element 412, which indicates that the technician's response to a prompt of the path element 408. The repair tool 4 can store data indicative of the technician's selection in the feedback data 218. In another embodiment, the repair tool 4 can determine a selection of a decision element based on the path elements that are performed. For example, the technician can perform path element 402. Subsequently, the technician performs path element 408, without selecting the decision element 404. However, the repair tool 4 can infer that the decision element 404 was selected based on the selection of the path elements 402 and 408.

The repair tool 4 can also store data indicative of the diagnostic steps that are not performed and the decision elements that are not selected. For example, if the decision element 406 is selected, the repair tool 4 can determine that the decision element 404 is not selected. Further, the repair tool 4 can determine that the path elements that the decision element 404 leads to are not performed. In another example, all but one of the diagnostic steps of a path element are performed. The repair tool 4 can determine that the diagnostic step is not performed.

The repair tool 4 can also store data associated with the performance of a diagnostic flowchart. For example, the repair tool 4 can use time data associated with the performance of the diagnostic flowchart. For example, the repair tool 4 can use the timer 208 to measure the amount of time that it takes to perform a diagnostic step or a path element. For example, a user can select a diagnostic step to indicate the performance of the step. The processor 302 will activate the timer 208 upon receiving the user input. The timer 208 can also stop based on a user input. For example, the user can select a second diagnostic step. Accordingly, the processor 302 can determine that the first diagnostic step has been completed and will stop the timer for the first diagnostic step. In another example, the user can input a measurement associated with the first diagnostic step. Accordingly, the user can determine that the first diagnostic step has been performed and can stop the timer for the first diagnostic step. Similarly, the processor 302 can use a user input or inferences in order to determine the time it takes to perform a path element. The server 102 can also include a timer. The timer of the server 102 can track the amount of time that it takes a repair tool to perform a diagnostic flowchart.

In another example, the repair tool 4 can store data indicative of the experience level of the technician performing or overseeing the performance of a diagnostic flowchart. The data indicative of time and/or of the level of experience of a technician can be stored in the feedback data 218. The repair tool 4 can also store data indicative of the measurements that are performed and the data that is received at the repair tool 4 during the performance of the diagnostic flowchart. The measurements can include any measurements that the technician performs, using the MT 900 for instance. The measurements can also include data received from the ECU such as (i) an ECU identifier, (ii) a parameter identifier (PID), (iii) a mode identifier that identifies a current data mode, a freeze frame data mode, a vehicle information mode, a DTC mode, or some other mode, (iv) a parameter value, or (v) some other vehicle data.

The performance of the diagnostic flowchart can continue until a final path element is performed. The final path element of a flowchart completes a diagnostic process that includes the path elements performed and the decision elements selected to reach the final path element. For example, path element 426 can be a final path element. The path element 426 can be the final path element of a diagnostic process that also includes path elements 402, 408, and 418. This diagnostic process can also include decision elements 404, 414, and 422. The final path element can include a prompt inquiring whether the diagnostic process performed correctly diagnosed the problem. The technician can provide an input indicative of the success of the diagnostic process. Alternatively, the repair tool 4 can determine whether the diagnostic process was successful in diagnosing the problem. For example, the repair tool 4 can determine the success of the diagnostic process by requesting data (e.g., DTC) from the ECU of vehicle 1. For instance, the repair tool 4 can determine the diagnostic process was successful if the DTC is no longer set active. In another example, the repair tool 4 may monitor one or more parameters of the subject vehicle in order to determine whether the diagnostic process was successful. The repair tool 4 can also determine the success of the diagnostic process by performing measurements. The repair tool 4 can store the data indicative of the success of the diagnostic process in the feedback data 218.

In some examples, the technician can skip performing a diagnostic step or can perform an additional diagnostic step when performing a path element. As an example, the repair tool 4 can determine that a diagnostic step was not performed. The repair tool 4 can display an alert to the technician that the diagnostic step was skipped. The technician can confirm (e.g., via an input) that the diagnostic step was not skipped in error. The repair tool 4 can store that data indicative of the skipped diagnostic step in the feedback data 218. As another example, the technician can perform an additional diagnostic step. For instance, the repair tool 4 can receive a measurement from the MT 900 indicative of a measurement performed by the technician. The repair tool 4 can determine that the measurement is not associated with any of the diagnostic steps of the path element that the technician is performing. Thus, the repair tool 4 can determine that an additional diagnostic step was performed. The repair tool 4 can store data indicative of the additional diagnostic step in the feedback 318. As another example, the repair tool 4 can store data in feedback data 218 indicative of the order in which the path elements are performed. A diagnostic process can be performed in an order different than the order of the path elements and decision elements of the OEM diagnostic flowchart. For example, the technician can perform path element 432 before performing path element 416.

In some examples, the repair tool 4 may create a session list that is associated with the subject vehicle. The session list may include a log of all the actions that performed with respect to the subject vehicle. For example, the session list may include data indicative of the diagnostic flowchart that the repair tool 4 is performing. Further, the session list may include data indicative of the diagnostic process that is performed with respect to the subject vehicle. That is, the session list may include data indicative of diagnostic steps performed, measurement values, and decisions made at decision elements. The session list may be used to reinitiate a diagnostic process when there is a stoppage during the process. For example, a technician may stop a diagnostic process after performing some steps of a diagnostic chart and may want to continue the process at a later time. Thus, when the technician resumes the process, the repair tool 4 may use the session list to start the diagnostic process at the last place that the technician left off.

The repair tool 4 can periodically transmit the data stored in the feedback data 218 to the server 102 during the performance of a diagnostic process. Alternatively, the repair tool 4 can transmit the data stored in the feedback data 218 to the server 102 once the diagnostic process is completed. The data can include an identifier, such as the DTC that the diagnostic flowchart is associated with, such that the server 102 can determine the diagnostic flowchart with which the data is associated. The identifier can also be a unique identifier of the diagnostic flowchart. As explained above, the server 102 can assign each diagnostic flowchart stored in the CRM 310 a unique identifier. Data associated with the diagnostic flowchart can be assigned the same unique identifier as the diagnostic flowchart.

Returning to FIG. 6, block 608 includes determining first feedback data associated with a performance of the first diagnostic flowchart at the diagnostic computing device. The processor can execute program instructions included in the CRPI 314 to receive feedback data from a repair tool. For example, those program instructions can be executed by the processor 302 to cause the network interface 304 to receive feedback associated with diagnostic flowcharts sent to repair tools. The processor 302 can store the received feedback data in the flowchart feedback 320. As explained above, the feedback data associated with a diagnostic flowchart can include data indicative of the diagnostic steps of the flowchart that are performed, measurements that can result from performing the diagnostic steps, the success of a diagnostic process, VDM data, decision elements of the diagnostic flowchart that are selected, time data, experience level data, and VRT data.

Next, block 610 includes modifying the first diagnostic flowchart based at least on the first feedback data. As illustrated in FIG. 1, a plurality of repair tools can be coupled to the server 102. Each repair tool can be configured to request and receive a diagnostic flowchart from the server 102. Further, each repair tool can transmit feedback data, associated with the diagnostic flowchart that it performs, to the server 102. Thus, the flowchart feedback 320 can include feedback data associated with each diagnostic flowchart that has been performed at a repair tool. Feedback data for diagnostic charts that have been performed more than once can include feedback data from each performance. The server 102 can use the feedback data to modify a diagnostic flowchart. Modifying a flowchart can include adding an element (i.e., path element or decision element), removing an element, modifying an element, or changing the order of the elements. In an embodiment, a trigger event can cause the processor 302 to modify a diagnostic flowchart. For example, the trigger event can be the number of times that a diagnostic flowchart has been performed. Once the diagnostic flowchart has been performed a predetermined number of times, the processor 302 can be triggered to modify the diagnostic flowchart. In another example, the trigger event can be a user input by a technician.

In an embodiment, a diagnostic flowchart can be modified on the basis of analytical data associated with the flowchart. The processor 302 can generate analytical data by analyzing data stored in feedback data 318. More specifically, the processor 302 can analyze the feedback data associated with each diagnostic flowchart in order to generate analytical data specific to each diagnostic flowchart. In an embodiment, the processor 302 can analyze aggregate feedback data from all of the performances of a diagnostic flowchart in order to generate analytical data. In an example, the processor 302 can analyze the aggregate feedback data associated with a diagnostic flowchart to generate statistical data indicative of the number of times a specific path element was performed in the aggregate performances of the diagnostic flowchart. In another example, the processor 302 can analyze the aggregate feedback data associated with a diagnostic flowchart to generate statistical data indicative of the number of times a specific decision element was selected in the aggregate performances of the diagnostic flowchart. In another example, the processor 302 can analyze the aggregate feedback data associated with a diagnostic flowchart to generate statistical data indicative of the number of times a specific diagnostic step was performed in the aggregate performances of the diagnostic flowchart. In yet another example, the processor 302 can analyze the aggregate feedback data associated with a diagnostic flowchart to generate statistical data indicative of the number of times that a diagnostic process of the diagnostic flowchart was performed.

In another embodiment, the processor 302 can analyze the aggregate feedback data associated with a diagnostic flowchart in order to generate data indicative of trends that can exist in the aggregate performances of the diagnostic flowchart. In an example, the generated data can indicate that a diagnostic process that includes certain path elements and decision elements diagnoses the problem in a shorter time than other diagnostic processes that have been performed using the diagnostic flowchart. In another example, the generated data can indicate the success of a specific diagnostic process in correctly diagnosing the problem. In another example, the generated data can be indicative of trends that exist based on the geographic regions of the repair tools that performed the diagnostic flowchart. For instance, the feedback data associated with the diagnostic flowchart and a first geographic region can indicate that a first diagnostic process has a higher rate of performance success when performed by repair tools in the first geographic region than when performed by repair tools in a second geographic region. In another embodiment, the generated data can be indicative of the number of times that a path element, decision element, or a diagnostic step was skipped by the technicians performing the diagnostic flowchart.

As an example of a diagnostic chart modification, consider the diagnostic flowchart 400 that is associated with DTC 41. The diagnostic flowchart 400 can be sent multiple times to one or more repair tools. Accordingly, the data associated with the diagnostic flowchart 400 can be data that is received from the plurality of repair tools, each of which have performed a diagnostic process using the diagnostic flowchart 400. The processor 302 can use the aggregate feedback data associated with the diagnostic flowchart 400 to modify the diagnostic flowchart 400. The processor 302 can also use the analytical data associated with the diagnostic flowchart to modify the diagnostic flowchart 400.

In a first embodiment, the processor 302 can modify the elements of the diagnostic flowchart 400. The processor 302 can modify the elements of the diagnostic flowchart 400 by removing a path element. For example, the analytical data associated with the diagnostic flowchart 400 can indicate that the path element 426 was performed only 3 times during 100 performances of the diagnostic flowchart 400. The processor 302 can modify the diagnostic flowchart if the performance percentage is less than a certain threshold, which can be predetermined. If the performance percentage of the path element 426 is less than the threshold, the processor 302 can modify the diagnostic flowchart 400 by removing the path element 426. In another example, the processor 302 can modify the elements of the diagnostic flowchart 400 by adding a path element.

The analytical data associated with the diagnostic flowchart 400 can indicate that an additional path element was performed 70 times during 100 performances of the diagnostic flowchart 400. The processor 302 can modify the diagnostic flowchart if the performance percentage is greater than a certain threshold, which can be predetermined. If the performance percentage of the additional path element is greater than the threshold, the processor 302 can modify the diagnostic flowchart 400 by adding the path element to the diagnostic flowchart 400. Similarly, the processor 302 can modify the diagnostic flowchart by adding and/or removing decision elements from the diagnostic flowchart 400.

In a second embodiment, the processor 302 can modify the diagnostic steps of a specific path element of the diagnostic flowchart 400. The processor 302 can modify a diagnostic step of a path element by removing the diagnostic step. For example, the analytical data associated with the diagnostic flowchart 400 can indicate that a diagnostic step of path element 426 was performed only 3 times during 100 performances of the diagnostic flowchart 400. The processor 302 can modify the diagnostic flowchart if the performance percentage is less than a certain threshold, which can be predetermined. If the performance percentage of the diagnostic step is less than the threshold, the processor 302 can modify the diagnostic flowchart 400 by removing the diagnostic step from the path element 426. In another example, the processor 302 can modify the diagnostic steps of a path element of the diagnostic flowchart 400 by adding a diagnostic step. The analytical data associated with the diagnostic flowchart 400 can indicate that an additional diagnostic step was performed 70 times during 100 performances of the diagnostic flowchart 400.

In a third embodiment, the processor 302 can modify the diagnostic flowchart by changing the order of the elements in the diagnostic flowchart. For example, the analytical data associated with the diagnostic flowchart 400 can indicate that the elements of a diagnostic process were performed in a specific order a number of times. Further, the processor 302 can determine that the order that the diagnostic process is performed in is not included in the diagnostic flowchart 400. Accordingly, if the performance percentage of the diagnostic process in the specific order is greater than a certain threshold, the processor 302 can modify the diagnostic flowchart 400, such that the modified diagnostic flowchart 400 includes the elements of the diagnostic process arranged in the specific order.

In an embodiment, the analytical data generated by the processor 302 can be weighted using factors. For example, the experience level of a technician can be used as a factor to weight the data. For instance, the feedback data that generated by a performance of the diagnostic flowchart by a technician with higher experience level can be weighted more heavily than the feedback data that was generated by a performance of the diagnostic flowchart by a technician with a lower experience level. In another example, the success of a diagnostic process in diagnosing the vehicle problem can be used to weight the data. For example, a diagnostic process that resulted in a successful diagnosis can be weighted more heavily than a diagnostic process that did not result in a successful diagnosis.

The processor 302 can use the weighted analytical data to determine the modifications made to a diagnostic flowchart 400. In an embodiment, the weighted data can be used to determine whether the performance percentage of an element is greater than a threshold. Data that is weighted more heavily can meet the threshold with fewer performances than data that is weighted less heavily. Consider, for example, that the diagnostic flowchart 400 has been performed by a first technician and a second technician that is more experienced than the first technician. Both technicians add a diagnostic step to a diagnostic process when performing the diagnostic flowchart 400. As the second technician is more experienced, the feedback data from the performance of the diagnostic flowchart by the second technician is weighted more heavily than the feedback data from the performance of the diagnostic flowchart by the first technician. The weighted data can be used to calculate the performance percentages. Therefore, fewer performances of the diagnostic flowchart by more experienced technicians can be needed to meet the threshold than the performances needed by less experienced technicians.

In another embodiment, the processor 302 can use the weighted data to determine which modification to choose from a plurality of possible modifications. Consider, for example, that the diagnostic flowchart 400 has been performed by two groups of technicians. The first group of technicians who performed the diagnostic flowchart added a diagnostic step to the process. The second group of technicians who performed the diagnostic flowchart added a different diagnostic step to the process. However, the second group of technicians may have a higher level of experience than the first group of technicians. Thus, feedback data of the performance of the diagnostic flowchart by the second group of technicians can be weighted more heavily than the feedback data of the performance of the diagnostic flowchart by the first group of technicians. In this example, the processor 302 can use the weighted data to determine which diagnostic step to add to the diagnostic process. Thus, the processor 302 can add the diagnostic step performed by the second group of technicians.

In another embodiment, the feedback data can be data indicative of an input from a technician performing the diagnostic steps of the diagnostic flowchart. As explained above, the technician's input can be based on a service bulletin received from a vehicle manufacturer (i.e., an original equipment manufacturer (OEM)) of vehicles or a vehicle parts manufacturer (i.e., an OEM of vehicle parts installed on a vehicle at the assembly plant of a vehicle OEM), a diagnostic equipment manufacturer or a manufacturer of after-market vehicle parts, or a provider of vehicle service information, such as the Mitchell Repair Information Company, LLC. The service bulletin can include one or more modifications to a diagnostic flowchart. For example, the service bulletin can specify adding an element (i.e., path element or decision element), removing an element, modifying an element, or changing the order of the elements of a diagnostic flowchart. The service bulletin can identify the diagnostic flowchart, to which the diagnostic flowchart is directed, by using a diagnostic flowchart identifier. In another example, the technician's input can be indicative of one or more diagnostic steps from a different diagnostic flowchart than the diagnostic flowchart is that currently being performed at the diagnostic repair tool.

It should be understood that method 600 is described herein for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location. Note that the description herein of the modifications to a diagnostic flowchart includes examples and should not be considered limiting. Additional modifications to a diagnostic flowchart can be possible. For example, additional modifications can be apparent to one of ordinary skill in the art.

Operations relating to the repair tool described above can be implemented as a method by one or more processors. As explained above, one or more repair tools can be coupled to a server. Further, each repair tool can be implemented on a single computing device with one or more processors. An example method 700 describing the operations of a repair tool is illustrated in the form of a flowchart in FIG. 7.

Block 702 includes determining that a first input indicates a vehicle problem. Block 704 includes sending a request indicative of the vehicle problem to a computing server. Block 706 includes receiving from the computing server a first diagnostic flowchart associated with the vehicle problem, where the first diagnostic flowchart comprises one or more ordered and performable path elements, where each path element leads to one or more ordered decision elements, where each path element comprises one or more diagnostic steps. Block 708 includes outputting the first diagnostic flowchart to be displayed on a graphical interface of a display device. Block 710 includes determining that a second input indicates an instruction to perform at least one path element of the first diagnostic flowchart. Block 712 includes performing the at least one path element. Block 714 includes determining first feedback data associated with the at least one performed path element.

It should be understood that method 700 is described herein for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

V. Example Computing Devices

Figure 8:
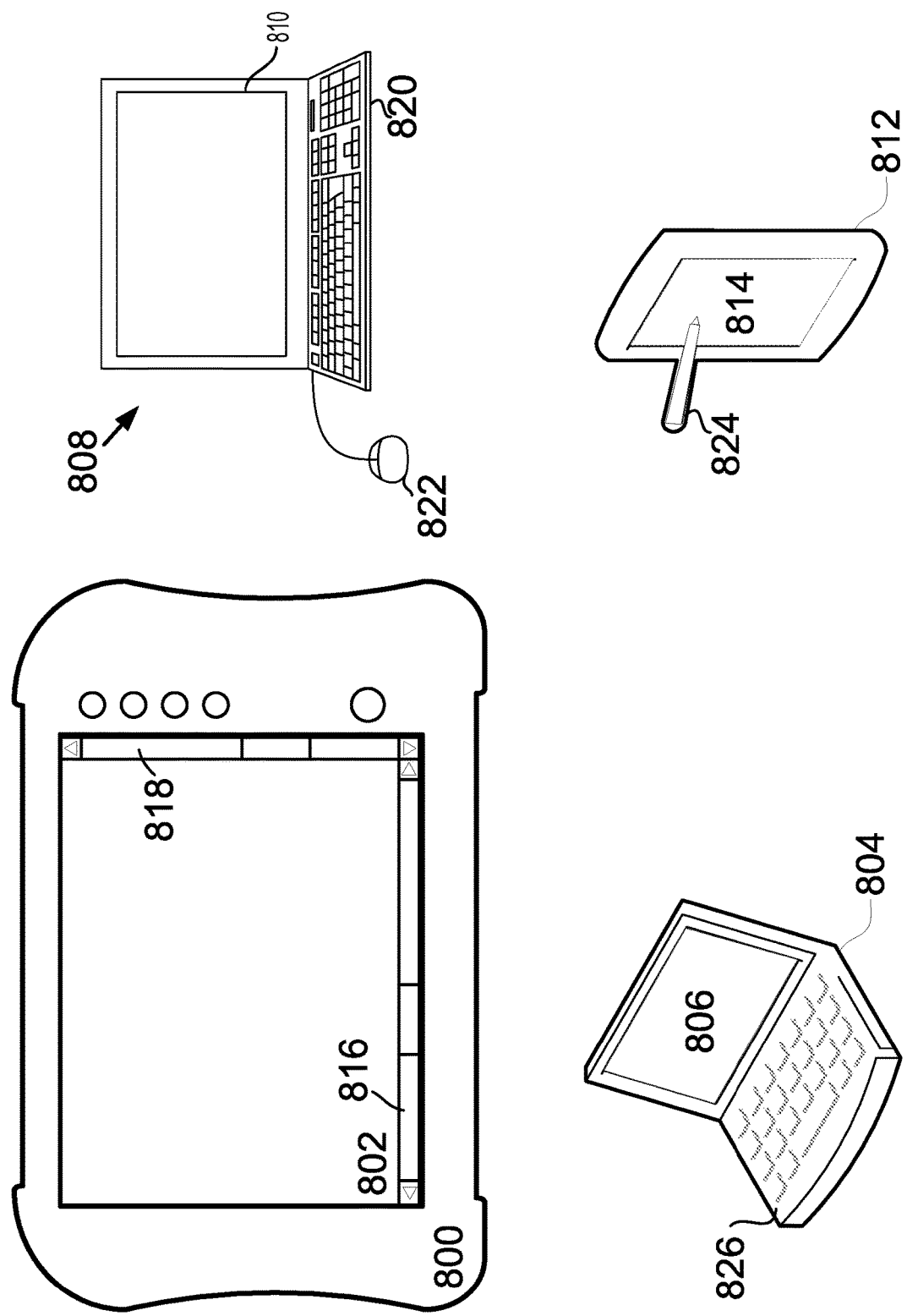
FIG. 8 shows a plurality of display devices having a display in accordance with an example embodiment.

FIG. 8 shows a plurality of example devices having a display screen. A first example device shown in FIG. 8 is a device 800 that includes a display 802. The device 800 can include, or can be configured to operate as, a vehicle repair tool (e.g., the repair tool 4), a server (i.e., the server 102), or at least as part of a vehicle repair tool or a server. As an example, the device 800 can include, or can be configured as, a hand-held vehicle repair tool, such as a MODIS™ ultra integrated diagnostic system (reference number EEMS328W) available from Snap-on Incorporated of Kenosha, Wisconsin.

Another example display device shown in FIG. 8 is a device 808. The device 808 can include a display 810, and can include one or more of a keyboard 820 and a pointing device 822. The device 808 can include, or can be configured as, a desktop computing system, such as an OptiPlex® 9020 Mini Tower desktop computing system available from Dell Computer Corporation, Austin, Texas, or some other desktop computing system. The keyboard 820 can include, or can be configured as, a wired or wireless QWERTY keyboard or some other keyboard for entering data or selections into the device 808. The pointing device 822 can include, or can be configured as, a wired or wireless computer mouse. The device 808 can include or be configured to operate as a vehicle repair tool, a server, or at least as part of a vehicle repair tool or a server.

Another example display device shown in FIG. 8 is a device 804. The device 804 can include a display 806 and can include a keyboard 226. The display device 804 can include, or can be configured as, a laptop computing system, such as the Dell Chromebook 11 desktop computing system available from Dell Computer Corporation, or some other laptop computing system. The display device 804 can include or be configured operate as a vehicle repair tool, a server, or at least as part of a vehicle repair tool or a server.

Another example display device shown in FIG. 8 is a device 812 having a display 814. The device 812 can include, or can be configured as, a smartphone (such as an IPHONE® smartphone from Apple Inc. of Cupertino, California, or a GALAXY S® smartphone from Samsung Electronics Co., Ltd. Of Maetan-Dong, Yeongtong-Gu Suwon-Si, Gyeonggi-Do, Republic of Korea). Alternatively, the device 812 can include, or can be configured as, a tablet device (such as an IPAD® tablet device from Apple Inc., or a SAMSUNG GALAXY TAB tablet device from Samsung Electronics Co., Ltd.). Data or selections can be entered at the device 812 by way of a stylus 824 in contact with the display 814. Data or selections can be entered at the device 812 in other ways as well. The device 812 can include or be configured to operate as a vehicle repair tool, a server, or at least as part of a vehicle repair tool or a server.

The display screens 802, 806, 810, and 814 can include, or can be configured as, any example display described herein or some other type of display configured for displaying the displayable aspects described herein, such as diagnostic flowcharts. A first example display includes or is configured as a capacitive touch display. A second example display includes or is configured as a resistive touch display. A third example display includes or is configured as a plasma display. A fourth example display includes or is configured as a light emitting diode (LED) display. A fifth example display includes or is configured as a cathode ray tube display. A sixth example display includes or is configured as an organic light-emitting diode (OLED) display, such as an active-matrix OLED or a passive-matrix OLED. A seventh example display includes or is configured as a touch-display such as a color touch used on a MODIS™ ultra integrated diagnostic system. An eighth example display includes or is configured as a backlit color liquid crystal display (LCD) having a resistive touch or panel.

As shown in FIG. 8, the display 802 can display a horizontal scroll bar 816 and a vertical scroll bar 818. The horizontal scroll bar 816 can be used to cause the device 800 to display an unseen portion of a graphical interface at the display 802 instead of another portion of the graphical interface currently displayed at the display 802. The vertical scroll bar 818 can be used to cause the device 800 to display another unseen portion of the graphical interface at the display 802 instead of the portion of the graphical interface currently displayed at the display 802. Any other display described herein can include a horizontal scroll bar configured to operate like the horizontal scroll bar 816. Any other display described herein can include a vertical scroll bar configured to operate like the vertical scroll bar 818.

Figure 9:
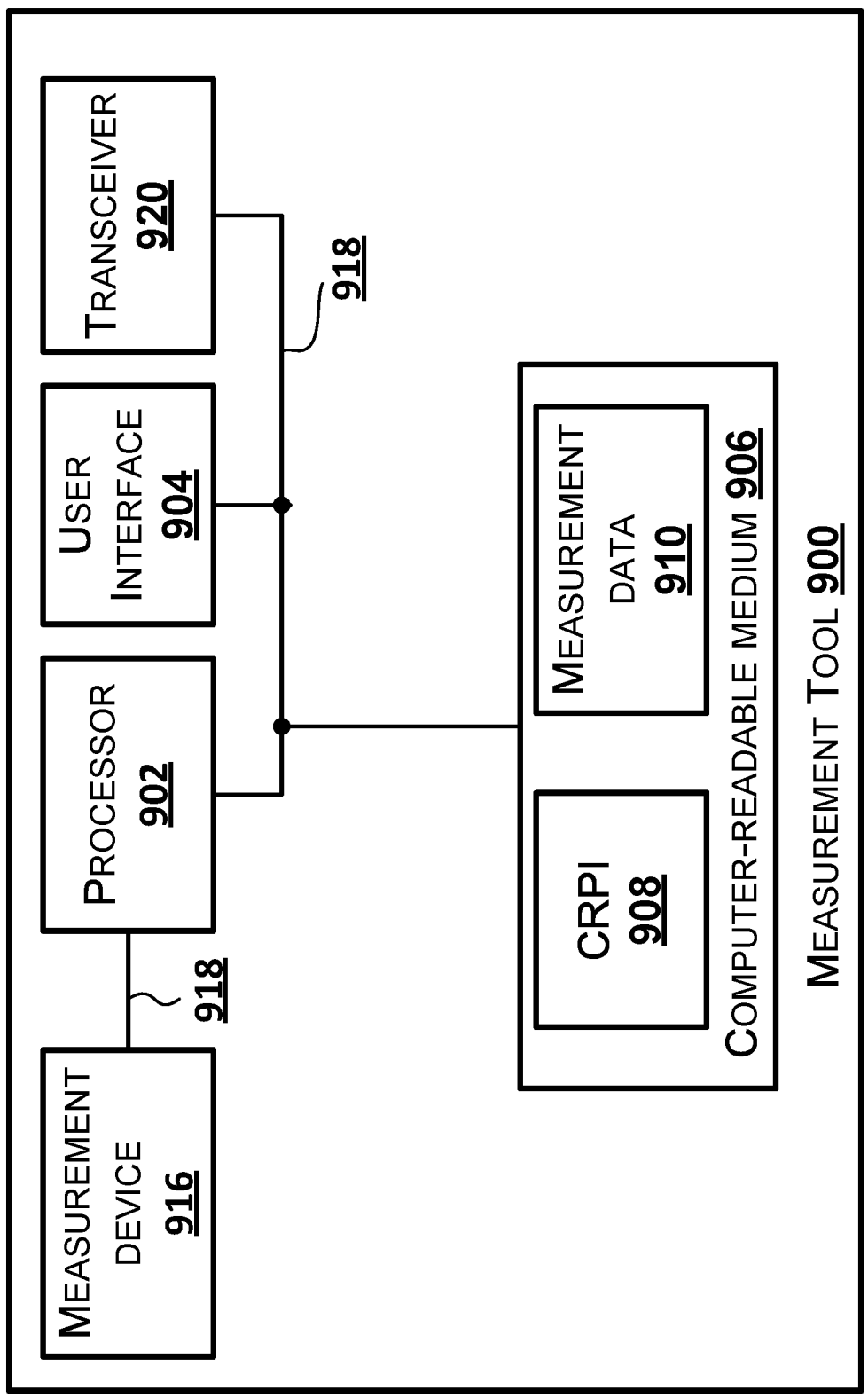
FIG. 9 is a block diagram of a measurement tool in accordance with an example embodiment.

Next, FIG. 9 is a block diagram of a measurement tool. A measurement tool can be used to carry out (i.e., perform) a measurement. A processor can generate a tool measurement (i.e., data to represent each measurement carried out by an MT). A tool measurement can be referred to as "tool measurement data." The example embodiments can perform various functions with respect to the tool measurement, such as storing the tool measurement in a computer-readable medium and transmitting the tool measurement to a repair tool sending instructions to the measurement tool. Transmitting the tool measurement can include transmitting the tool measurement over an air interface or a wire.

As shown in FIG. 9, the MT 900 includes a processor 902, a user interface 904, a transceiver 920, and a computer-readable medium 906. Two or more of those items of the MT 900 can be communicatively coupled or linked together via a system bus, network, or other connection mechanism 918. Any MT described in this description can be configured like the MT 900 or include one or more of the items of the MT 900.

The user interface 904 can include user interface components for manually entering a tool measurement based on a measurement performed by a measurement tool. For example, the tool measurement can include a compression measurement of one or more engine cylinders in a vehicle. As another example, the tool measurement can be a thickness measurement of a brake part such as a brake rotor, brake drum, brake caliper, a brake pad, or a brake shoe performed using a measurement caliper, such as a digital electronic caliper, model number MCAL6A, available from Snap-on Incorporated. The tool measurement entered via the user interface 904 can be stored within the measurement data 910. Manually entering tool measurement can be necessary when the measurement tool that carried out the measurement does not include a transceiver to transmit the message to a repair tool 200. Alternatively, tool measurement data can be entered manually via the user interface 210 of the repair tool 200.

The MT 900 can include or be configured as a wheel alignment machine (WAM), a brake lathe, a wheel balancer, a tire tread measurement machine, a digital volt ohm meter (DVOM), a compression gauge, a caliper, a fuel pressure gauge, an oil pressure gauge, a temperature gauge, or an air conditioning manifold gauge set. Other examples of the MT 900 are also possible.

The CRM 906 can include any of the following data: computer-readable program instructions 908, and measurement data 910. The CRPI 908 includes program instructions executable by the processor 902. The CRPI 908 can include program instructions that are executable to perform one or more of the following functions: determine a tool measurement from a measurement input, store a tool measurement in the measurement data 910, display a tool measurement on a display of the user interface 904, and transmit a tool measurement using the transceiver 920. Other examples of functions that can be performed by execution of the program instructions contained in the CRPI 908 are also possible.

The MT 900 also includes a measurement device 916. The measurement device 916 can include any of a variety of devices for making a tool measurement, generating a measurement input to the processor 902, or providing a measurement input to the processor 902. As an example, the measurement device 916 can include a thermistor, transducer, a thermocouple, a potentiometer, an accelerometer, or a strain gauge. An electric current can be provided to the measurement device 900 for generating the measurement input provided to the processor 902 via a measurement circuit. The processor 902 receives the measurement input to determine the tool measurement. The tool measurements determined by the processor 902 can be stored in the measurement data 910. The measurement data 910 can include data indicating the units (e.g., volts, kilopascals, degrees Celsius, millimeters, etc.) of each tool measurement.

The feedback data transmitted can include an identifier that identifies the diagnostic flowchart with which the feedback data is associated. For example, the identifier can be the DTC code with which a diagnostic flowchart is associated.

The measurement tool 900 can be a computing device and can be arranged as or comprise the computing device 401 shown in FIG. 10 or any portion thereof. The CRPI 908 can be included as part of the program instructions 455 within a computer program product, such as the computer program product shown in FIG. 11.

As described above, the computing devices described herein can be any type of computing device. FIG. 10 is a functional block diagram illustrating an example computing device 401 used in a computing system that is arranged in accordance with at least some embodiments described herein. The computing device 401 can be implemented to determine estimate information or perform any of the functions described above with reference to FIGS. 1-9. In a basic configuration 403, computing device 401 can typically include one or more processors 405 and system memory 409. A memory bus 441 can be used for communicating between the processor 405 and the system memory 409. Depending on the desired configuration, processor 405 can be any type of processor including but not limited to a microprocessor (µP), a microcontroller (µC), a digital signal processor (DSP), or any combination thereof. A memory controller 407 can also be used with the processor 405, or in some implementations, the memory controller 407 can be an internal part of the processor 405.

Depending on the desired configuration, the system memory 409 can be any type of computer-readable memory including but not limited to volatile memory (such as RAM), non-volatile memory (such as ROM, flash memory, etc.) or any combination thereof. System memory 409 can include one or more applications 411, and program data 415. Application 411 can include an algorithm 413 that is arranged to receive vehicle information and provide the vehicle information to a communication network or receive vehicle information and determine estimate information, in accordance with the present disclosure. Program data 415 can include repair order data 417 that could be directed to any number of types of data. In some example embodiments, application 411 can be arranged to operate with program data 415 on an operating system.

Computing device 401 can have additional features or functionality, and additional interfaces to facilitate communications between the basic configuration 403 and any devices and interfaces. For example, data storage devices 419 can be provided including removable storage devices 421, non-removable storage devices 423, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 409 and storage devices 419 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 401. Any such computer storage media can be part of device 401.

Computing device 401 can also include output interfaces 431 that can include a graphics processing unit 433, which can be configured to communicate to various external devices such as display screens 437 or speakers via one or more A/V ports 435 or a communication interface 425. The communication interface 425 can include a network controller 427, which can be arranged to facilitate communications with one or more other computing devices 439 over a network (such as the network 104) via one or more communication ports 429. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 401 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 401 can also be implemented as a personal computer, including both laptop computer and non-laptop computer configurations, or a server.

Figure 11:
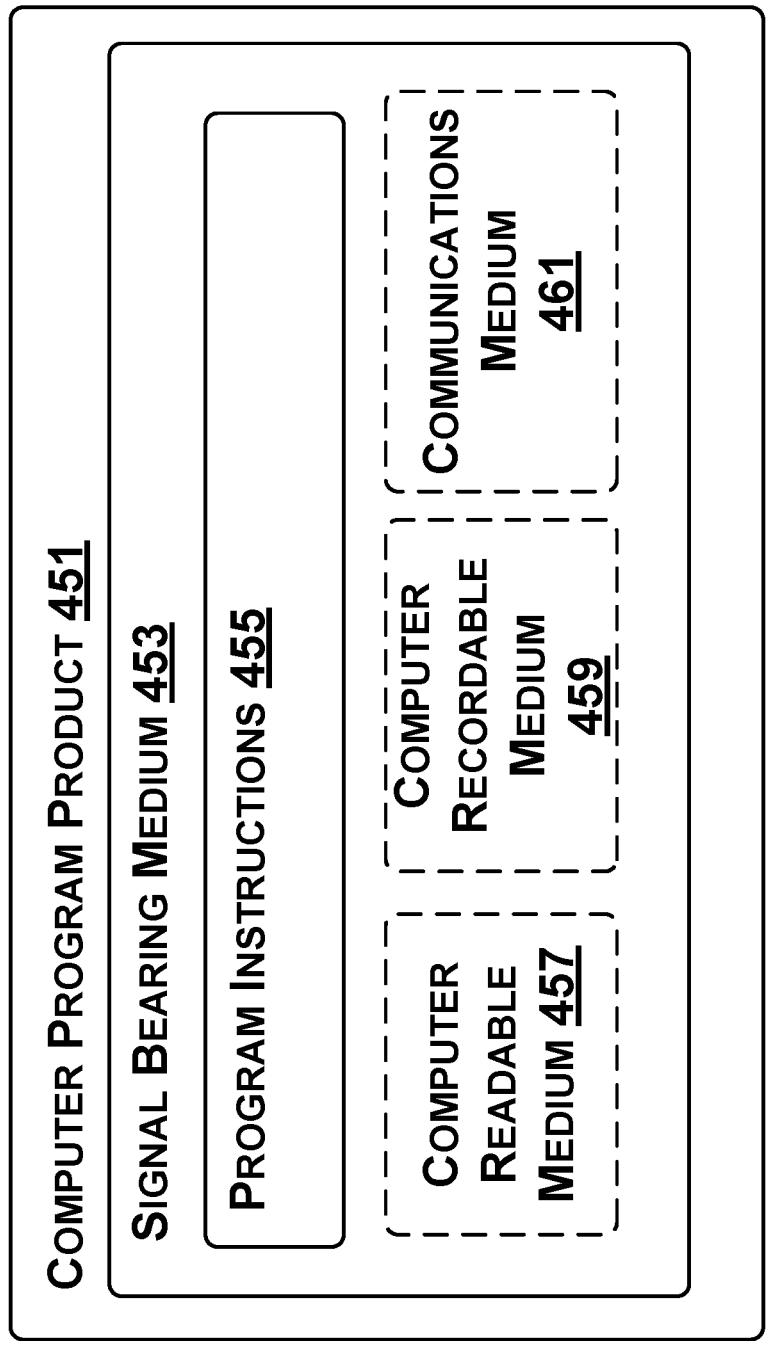
FIG. 11 is a schematic illustrating a conceptual partial view of an example computer program product that includes a computer program for executing a computer process on a computing device, arranged according to at least some example embodiment(s).

In some embodiments, the disclosed methods can be implemented as computer program instructions encoded on a non-transitory computer-readable storage media in a machine-readable format, or on other non-transitory media or articles of manufacture. FIG. 11 is a schematic illustrating a conceptual partial view of an example computer program product 451 that includes a computer program for executing a computer process on a computing device, arranged according to at least some embodiments presented herein.

In one embodiment, the example computer program product 451 is provided using a signal bearing medium 453. The signal bearing medium 453 can include one or more programming instructions 455. In some examples, the signal bearing medium 453 can encompass a computer-readable medium 457, such as, but not limited to, a hard disk drive, a Compact Disc (CD), a Digital Video Disk (DVD), a digital tape, memory, etc. In some implementations, the signal bearing medium 453 can encompass a computer recordable medium 459, such as, but not limited to, memory, read/write (R/W) CDs, R/W DVDs, etc. In some implementations, the signal bearing medium 453 can encompass a communications medium 461, such as, but not limited to, a digital and/or an analog communication medium (e.g., a fiber optic cable, a waveguide, a wired communications link, a wireless communication link, etc.). Thus, for example, the signal bearing medium 453 can be conveyed by a wireless form of the communications medium 461 (e.g., a wireless communications medium conforming to the IEEE 802.11 standard or other transmission protocol).

The one or more programming instructions 455 can be, for example, computer executable and/or logic implemented instructions. In some examples, a computing device such as the computing device 401 of FIG. 10 can be configured to provide various operations, functions, or actions in response to the programming instructions 455 conveyed to the computing device 401 by one or more of the computer-readable medium 457, the computer recordable medium 459, and/or the communications medium 461.

VI. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the scenarios, and flow charts discussed herein, and these scenarios and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also under that the terminology used herein is for the purpose of describing particular embodiments only, and is not intended to be limiting.

Embodiments of the present disclosure may thus relate to one of the enumerated example embodiments (EEEs) listed below.

EEE 1 is a method performed by a computing server, the method comprising: receiving, from a diagnostic computing device, a request indicative of a vehicle problem; selecting a first diagnostic flowchart associated with the vehicle problem from a plurality of diagnostic flowcharts, wherein each diagnostic flowchart comprises one or more ordered and performable path elements, wherein each path element leads to one or more decision elements, and wherein each path element comprises one or more diagnostic steps; sending the first diagnostic flowchart for performance at the diagnostic computing device; determining first feedback data associated with a performance of the first diagnostic flowchart at the diagnostic computing device; and modifying the first diagnostic flowchart based at least on the first feedback data.

EEE 2 is the method of EEE 1, further comprising: determining aggregated feedback data based on: (i) the first feedback data, (ii) feedback data determined from one or more other performances of the first diagnostic flowchart prior to being modified, wherein modifying the first diagnostic flowchart based at least on the first feedback data includes modifying the first diagnostic flowchart based on the aggregated feedback data.

EEE 3 is the method of EEE 2, further comprising: determining that a number of the one or more other performances of the first diagnostic flowchart and the performance of the first diagnostic flowchart is greater than a predetermined threshold of flowchart performances.

EEE 4 is the method of EEE 2 or 3, wherein the request is associated with a geographic region, wherein selecting the first diagnostic flowchart is based in part on the geographic region, and wherein the first diagnostic flowchart is associated with the geographic region.

EEE 5 is the method of any one of EEE 2 to 4, wherein the first feedback data comprises at least one of: (i) data indicative of a performance of at least one path element of the first diagnostic flowchart, (ii) one or more parameters obtained during the performance of the at least one path element, (iii) data indicative of a decision made for at least one decision element of the first diagnostic flowchart, (iv) data indicative of whether the performance of the diagnostic flowchart at the diagnostic computing device resulted in a correct diagnosis of the vehicle problem, and (v) data indicative of an input from technician performing the at least one path element.

EEE 6 is the method of EEE 5, wherein the input from the technician includes supplemental information received from an authorized entity, wherein the authorized entity is one of: (i) a vehicle manufacturer, or (ii) a vehicle part manufacturer, or (iii) a vehicle service information provider.

EEE 7 is the method of EEE 5 or 6 wherein the one or more parameters comprise at least one of: an experience level of the technician, an execution time of the at least one path element, and a measurement resulting from performance of the at least one path element.

EEE 8 is the method of any one or EEE 1 to 7, wherein the one or more path elements comprises at least two path elements in a first order, and wherein modifying the first diagnostic flowchart comprises changing an order of the at least two path elements to a second order different than the first order.

EEE 9 is the method of EEE 1 to 7, wherein the one or more path elements comprises at least two path elements in a first order, and wherein modifying the first diagnostic flowchart comprises removing at least one path element of the at least two path elements.

EEE 10 is the method of EEE 1 to 9, wherein modifying the first diagnostic flowchart comprises: adding at least one path element to the first diagnostic flowchart.

EEE 11 is the method of EEE 1 to 10, wherein modifying the first diagnostic flowchart comprises: modifying a diagnostic step of at least one of the one or more path elements.

EEE 12 is the method of EEE 1 to 11, wherein modifying the first diagnostic flowchart comprises at least one of adding a decision element to the first diagnostic flowchart, and changing at least one of the one or more decision elements of the first diagnostic flowchart.

EEE 13 is a method performed by a diagnostic computing device, the method comprising: determining that a first input indicates a vehicle problem; sending a first request indicative of the vehicle problem to a computing server; receiving from the computing server a first diagnostic flowchart associated with the vehicle problem, wherein the first diagnostic flowchart comprises one or more ordered and performable path elements, wherein each path element leads to one or more ordered decision elements, wherein each path element comprises one or more diagnostic steps; outputting the first diagnostic flowchart to be displayed on a graphical interface of a display at the diagnostic computing device; determining a second input to the diagnostic computing device indicates an instruction to perform at least one path element of the first diagnostic flowchart; performing the at least one path element; determining first feedback data associated with the performed at least one path element; and sending the first feedback data to the computing server.

EEE 14 is the method of EEE 13, wherein the first feedback data comprises at least one feedback element selected from the group consisting of: (i) data indicative of performance of at least one path element of the first diagnostic flowchart, (ii) one or more parameters obtained during performance of the at least one path element, (iii) data indicative of a decision made for at least one decision element of the first diagnostic flowchart, and (iv) data indicative of whether the performance of the diagnostic flowchart at the diagnostic computing device results in a correct diagnosis of the vehicle problem.

EEE 15 is the method of EEE 13 or 14, wherein performing the at least one path element comprises causing a measurement tool coupled to the apparatus to perform the at least one path element.

EEE 16 is the method of EEE 15, wherein the first feedback data comprises a measurement performed by the measurement tool.

EEE 17 is the method of any one of EEE 13 to 16, further comprising: sending, to the computing server, a second request for a second diagnostic flowchart associated with the vehicle problem; receiving the second diagnostic flowchart at the second diagnostic computing device; and outputting the second diagnostic flowchart to be displayed simultaneously with the first diagnostic flowchart on the graphical interface of the display at the diagnostic computing device.

EEE 18 is the method of EEE 17, wherein the second diagnostic flowchart is an original diagnostic flowchart, and wherein the first diagnostic flowchart is a modified diagnostic flowchart based on the original diagnostic flowchart.

EEE 19 is an apparatus comprising: a display device; a network interface; one or more processors; and at least one computer-readable medium storing program instructions, that when executed by the one or more processors, cause a set of functions to be performed, the set of functions comprising: determining that a first input indicates a vehicle problem; sending a request indicative of the vehicle problem to a computing server; receiving from the computing server a first diagnostic flowchart associated with the vehicle problem, wherein the first diagnostic flowchart comprises one or more ordered and performable path elements, wherein each path element leads to one or more decision elements, wherein each path element comprises one or more diagnostic steps; outputting the first diagnostic flowchart to be displayed on a graphical interface of the display device; determining that a second input indicates an instruction to perform at least one path element of the first diagnostic flowchart; performing the at least one path element; and determining first feedback data associated with the at least one performed path element.

EEE 20 is the apparatus of EEE 19, wherein determining the first feedback data associated with the at least one performed path element comprises determining one or more elements of the feedback data, and wherein the set of functions further comprise sending the one or more elements of the first feedback data to the computing server.

EEE 21 is the apparatus of EEE 19 or 20, wherein performing the at least one path element comprises causing a measurement tool coupled to the apparatus to perform the at least one path element, and wherein the first feedback data comprises measurement data obtained by the measurement tool during performance of the at least one path element.

EEE 22 is the apparatus of any one of EEE 19 to 21, wherein the apparatus is associated with a geographic region, and wherein the first diagnostic flowchart is associated with the geographic region.

EEE 23 is the apparatus of any one of EEE 19 to 22, wherein the one or more elements comprise at least one of (i) data indicative of performance of at least one path element of the first diagnostic flowchart, (ii) one or more parameters obtained during performance of the at least one path element, (iii) data indicative of a decision made for at least one decision element of the first diagnostic flowchart, and (iv) data indicative of whether the performance of the first diagnostic flowchart at the diagnostic computing device results in a correct diagnosis of the vehicle problem.

EEE 24 is the apparatus of any one of EEE 19 to 23, further comprising: a vehicle interface removably connectable to a vehicles wirelessly and/or by a wired communication link, wherein the vehicle interface is configured to transmit a request for vehicle data from the vehicle to perform at least a portion of the first path element and to receive vehicle data from the vehicle in response to the request for vehicle data, and wherein the first feedback data comprises vehicle data from the vehicle.

EEE 25 is a system comprising: a computing server including one or more processors; and at least one non-transitory computer readable medium containing program instructions executable by the one or more processors to: determine that a first request indicates a vehicle problem; select a first diagnostic flowchart associated with the vehicle problem from a plurality of diagnostic flowcharts, wherein each diagnostic flowchart comprises one or more ordered and performable path elements, wherein each path element leads to one or more ordered decision elements, wherein each path element comprises one or more diagnostic steps; send the first diagnostic flowchart for performance at a diagnostic computing device; determine first feedback data associated with a performance of the first diagnostic flowchart at the diagnostic computing device; and modify the first diagnostic flowchart based at least on the first feedback data.

EEE 26 is the system of EEE 25, further comprising: the diagnostic computing device, wherein the further program instructions stored in the at least one non-transitory computer readable medium and executable by at least the one or more processors to: determine that a first input indicates the vehicle problem; send a request indicative of the vehicle problem to the computing server; receive from the computing server the first diagnostic flowchart associated with the vehicle problem; output the first diagnostic flowchart to be displayed on a graphical interface of a display device; determine that a second input indicates an instruction to perform at least one path element of the first diagnostic flowchart; perform the at least one path element; and determine the first feedback data associated with the at least one performed path element.

EEE 27 is the system of EEE 25 or 26, wherein the plurality of diagnostic flowcharts are contained within the at least one non-transitory computer readable medium.

EEE 28 is the system of any one of EEE 25 to 27, wherein the program instructions are executable by the one or more processors to: determine aggregated feedback data based on the first feedback data and feedback data determined from one or more other occurrences of the first diagnostic flowchart being performed prior to being modified, wherein modifying the first diagnostic flowchart based at least one the first feedback data includes modifying the first diagnostic flowcharted based on the aggregated feedback data.

EEE 29 is a computer-readable medium having stored thereon instructions executable by at least one processor to cause a computing system to perform functions comprising: receiving, from a diagnostic computing device, a request indicative of a vehicle problem; selecting a first diagnostic flowchart associated with the vehicle problem from a plurality of diagnostic flowcharts, wherein each diagnostic flowchart comprises one or more ordered and performable path elements, wherein each path element leads to one or more decision elements, and wherein each path element comprises one or more diagnostic steps; sending the first diagnostic flowchart for performance at the diagnostic computing device; determining first feedback data associated with a performance of the first diagnostic flowchart at the diagnostic computing device; and modifying the first diagnostic flowchart based at least on the first feedback data.

EEE 30 is the computer-readable medium of EEE 29, wherein the functions further comprise: determining aggregated feedback data based on: (i) the first feedback data, (ii) feedback data determined from one or more other performances of the first diagnostic flowchart prior to being modified, wherein modifying the first diagnostic flowchart based at least on the first feedback data includes modifying the first diagnostic flowchart based on the aggregated feedback data.

EEE 31 is the computer-readable medium of EEE 30, wherein the functions further comprise: determining that a number of the one or more other performances of the first diagnostic flowchart and the performance of the first diagnostic flowchart is greater than a predetermined threshold of flowchart performances.

EEE 32 is the computer-readable medium of EEE 30 or 31, wherein the request is associated with a geographic region, wherein selecting the first diagnostic flowchart is based in part on the geographic region, and wherein the first diagnostic flowchart is associated with the geographic region.

EEE 33 is the computer-readable medium of any one of EEE 30 to 32, wherein the first feedback data comprises at least one of: (i) data indicative of a performance of at least one path element of the first diagnostic flowchart, (ii) one or more parameters obtained during the performance of the at least one path element, (iii) data indicative of a decision made for at least one decision element of the first diagnostic flowchart, (iv) data indicative of whether the performance of the diagnostic flowchart at the diagnostic computing device resulted in a correct diagnosis of the vehicle problem, and (v) data indicative of an input from technician performing the at least one path element.

EEE 34 is the computer-readable medium of EEE 33, wherein the input from the technician includes supplemental information received from an authorized entity, wherein the authorized entity is one of: (i) a vehicle manufacturer, or (ii) a vehicle part manufacturer, or (iii) a vehicle service information provider.

EEE 35 is the computer-readable medium of EEE 33 or 34 wherein the one or more parameters comprise at least one of: an experience level of the technician, an execution time of the at least one path element, and a measurement resulting from performance of the at least one path element.

EEE 36 is the computer-readable medium of any one or EEE 29 to 35, wherein the one or more path elements comprises at least two path elements in a first order, and wherein modifying the first diagnostic flowchart comprises changing an order of the at least two path elements to a second order different than the first order.

EEE 37 is the computer-readable medium of EEE 39 to 35, wherein the one or more path elements comprises at least two path elements in a first order, and wherein modifying the first diagnostic flowchart comprises removing at least one path element of the at least two path elements.

EEE 38 is the computer-readable medium of EEE 29 to 37, wherein modifying the first diagnostic flowchart comprises: adding at least one path element to the first diagnostic flowchart.

EEE 39 is the computer-readable medium of EEE 29 to 38, wherein modifying the first diagnostic flowchart comprises: modifying a diagnostic step of at least one of the one or more path elements.

EEE 40 is the computer-readable medium of EEE 29 to 39, wherein modifying the first diagnostic flowchart comprises at least one of adding a decision element to the first diagnostic flowchart, and changing at least one of the one or more decision elements of the first diagnostic flowchart.

EEE 41 is a computer-readable medium having stored thereon instructions executable by at least one processor to cause a computing system to perform functions comprising: determining that a first input indicates a vehicle problem; sending a first request indicative of the vehicle problem to a computing server; receiving from the computing server a first diagnostic flowchart associated with the vehicle problem, wherein the first diagnostic flowchart comprises one or more ordered and performable path elements, wherein each path element leads to one or more ordered decision elements, wherein each path element comprises one or more diagnostic steps; outputting the first diagnostic flowchart to be displayed on a graphical interface of a display at the diagnostic computing device; determining a second input to the diagnostic computing device indicates an instruction to perform at least one path element of the first diagnostic flowchart; performing the at least one path element; determining first feedback data associated with the performed at least one path element; and sending the first feedback data to the computing server.

EEE 42 is the computer-readable medium of EEE 41, wherein the first feedback data comprises at least one feedback element selected from the group consisting of: (i) data indicative of performance of at least one path element of the first diagnostic flowchart, (ii) one or more parameters obtained during performance of the at least one path element, (iii) data indicative of a decision made for at least one decision element of the first diagnostic flowchart, and (iv) data indicative of whether the performance of the diagnostic flowchart at the diagnostic computing device results in a correct diagnosis of the vehicle problem.

EEE 43 is the computer-readable medium of EEE 41 or 42, wherein performing the at least one path element comprises causing a measurement tool coupled to the apparatus to perform the at least one path element.

EEE 44 is the computer-readable medium of EEE 43, wherein the first feedback data comprises a measurement performed by the measurement tool.

EEE 45 is the computer-readable medium of any one of EEE 41 to 44, wherein the functions further comprise: sending, to the computing server, a second request for a second diagnostic flowchart associated with the vehicle problem; receiving the second diagnostic flowchart at the second diagnostic computing device; and outputting the second diagnostic flowchart to be displayed simultaneously with the first diagnostic flowchart on the graphical interface of the display at the diagnostic computing device.

EEE 46 is the computer-readable medium of EEE 45, wherein the second diagnostic flowchart is an original diagnostic flowchart, and wherein the first diagnostic flowchart is a modified diagnostic flowchart based on the original diagnostic flowchart.

The invention claimed is:

1. A method comprising:
 determining, by a processor a diagnostic trouble code contained within a vehicle data message received at the processor;
 transmitting, by the processor to a computing server, a first request indicative of the diagnostic trouble code;
 receiving, at the processor from the computing server, a diagnostic flowchart associated with the diagnostic trouble code, wherein:
  the diagnostic flowchart comprises a first path element, a second path element, a third path element, a first decision element, and a second decision element, the first path element, the first decision element, and the second decision element are arranged within the diagnostic flowchart so that the first path element is performed before the first or second decision element is selected,
  the first path element includes a diagnostic step and a measurement step to be performed during performance of the diagnostic step,
  the second path element is arranged within the diagnostic flowchart to follow a selection of the first decision element, and
  the third path element is arranged within the diagnostic flowchart to follow a selection of the second decision element;
 outputting, within a graphical user interface on a display, at least a first portion of the diagnostic flowchart, wherein the first portion of the diagnostic flowchart shows at least the first path element;
 executing, by the processor in response to receiving an input, a first instruction to perform the first path element, wherein performing the first path element comprises transmitting, by the processor to an electronic control unit in a particular vehicle, a message requesting the electronic control unit to control a vehicle component for a time period, and transmitting by the processor to a measurement tool, a second instruction for the measurement tool to determine a measurement of the vehicle component during the time period;
 controlling the measurement tool, in response to the second instruction, to measure the vehicle component during the time period when the vehicle component is controlled in response to the message, wherein performing the first path element further comprises receiving, at the processor from the measurement tool, measurement data indicative of a vehicle component measurement;
 selecting, by the processor based on a prompt of the first path element and the measurement data, the first decision element or the second decision element, and
 outputting, within the graphical user interface on the display, at least a second portion of the diagnostic flowchart, wherein the second portion of the diagnostic flowchart shows at least the second path element if the processor selected the first decision element or at least the third path element if the processor selected the second decision element.

2. The method according to claim 1,
 wherein determining the measurement of the vehicle component includes:
  transmitting, by the measurement tool to an electronic control unit in the particular vehicle, a first vehicle data message including a parameter identifier,
  receiving, at the measurement tool from the electronic control unit in the particular vehicle, a second vehicle data message including the parameter identifier and a parameter value, and
  converting, at the measurement tool, the parameter value to the measurement.

3. The method according to claim 1, wherein the measurement tool includes a measurement caliper, a voltmeter, a wheel alignment machine, a brake lathe, a wheel balancer, a tire tread measurement machine, a compression gauge, a fuel pressure gauge, an oil pressure gauge, a temperature gauge, or an air conditioning manifold gauge set.

4. The method according to claim 1, wherein:
 the measurement tool includes a digital volt ohm meter, and
 the measurement includes a voltage measurement or a resistance measurement.

5. The method according to claim 1,
 wherein the measurement tool includes a thermistor, a transducer, a thermocouple, a potentiometer, an accelerometer, or a strain gauge, and
 wherein the measurement tool uses the thermistor, the transducer, the thermocouple, the potentiometer, the accelerometer, or the strain gauge to perform the measurement.

6. The method according to claim 1, wherein:
 the diagnostic trouble code is set active by an electronic control unit in the particular vehicle, and
 the method further comprises:
  requesting, by the processor from the electronic control unit, data regarding the diagnostic trouble code after a performance of the diagnostic flowchart, and determining, by the processor, the performance of the diagnostic flowchart was successful based on the data regarding the diagnostic trouble code indicating the diagnostic trouble code is no longer set active.

7. The method according to claim 1, further comprising: determining, by the processor, first feedback data associated with performing the diagnostic flowchart, wherein: the first feedback data includes one or more from among:
data indicative of performing the first path element of the diagnostic flowchart,
data indicative of a decision made for at least one decision element of the diagnostic flowchart, or
data indicative of whether the performance of the diagnostic flowchart results in a correct diagnosis of the diagnostic trouble code.

8. The method according to claim 1, further comprising: determining, by the processor, first feedback data associated with performing the diagnostic flowchart, wherein: performing the diagnostic flowchart comprises a vehicle interface coupled to the processor transmitting a vehicle data message to a particular vehicle and the processor receiving, from the vehicle interface, vehicle data from the particular vehicle, and
the first feedback data includes the vehicle data from the particular vehicle.

9. The method according to claim 8, wherein the vehicle data from the particular vehicle includes a parameter identifier and a parameter value corresponding to the parameter identifier.

10. The method according to claim 1, further comprising: receiving, by the processor via use of a user interface, a selection of a particular portion of the diagnostic flowchart, and
outputting the particular portion of the diagnostic flowchart within the graphical user interface.

11. The method according to claim 10, wherein the particular portion of the diagnostic flowchart includes a particular path element including text describing a diagnostic step.

12. The method according to claim 1, further comprising: outputting, by the processor onto the display, an analytic corresponding to following a particular path of the diagnostic flowchart.

13. The method of claim 1, wherein the first portion of the diagnostic flowchart also shows the first decision element and the second decision element.

14. A computing system comprising:
a measurement tool;
a display;
a processor; and
a non-transitory computer-readable memory storing program instructions, wherein execution of the program instructions by the processor causes the computing system to:
determine a diagnostic trouble code contained within a vehicle data message received at the processor;
transmit, to a computing server, a first request indicative of the diagnostic trouble code;
receive, at the processor from the computing server, a diagnostic flowchart associated with the diagnostic trouble code, wherein:
the diagnostic flowchart comprises a first path element, a second path element, a third path element, a first decision element, and a second decision element, the first path element, the first decision element, and the second decision element are arranged within the diagnostic flowchart so that the first path element is performed before the first decision element or the second decision element is selected,
the first path element includes a diagnostic step and a measurement step to be performed during performance of the diagnostic step,
the second path element is arranged within the diagnostic flowchart to follow a selection of the first decision element, and
the third path element is arranged within the diagnostic flowchart to follow a selection of the second decision element;
output, within a graphical user interface on the display, at least a first portion of the diagnostic flowchart, wherein the first portion of the diagnostic flowchart shows at least the first path element;
execute, by the processor in response to receiving an input, a first instruction to perform the first path element, wherein execution of first instruction to perform the first path element causes the processor to transmit: (i) a message to an electronic control unit in a particular vehicle, the message for requesting the electronic control unit to control a vehicle component for a time period, and (ii) a second instruction to the measurement tool, the second instruction for the measurement tool to determine a measurement of the vehicle component during the time period;
control the measurement tool, in response to the second instruction, to measure the vehicle component during the time period when the vehicle component is controlled in response to the message, wherein performing the first path element further comprises receiving, at the processor from the measurement tool, measurement data indicative of a vehicle component measurement;
select, by the processor based on a prompt of the first path element and the measurement data, the first decision element or the second decision element, and
output, within the graphical user interface on the display, at least a second portion of the diagnostic flowchart, wherein the second portion of the diagnostic flowchart shows at least the second path element if the processor selected the first decision element or at least the third path element if the processor selected the second decision element.

15. The computing system according to claim 14, wherein the measurement tool includes a measurement caliper, a voltmeter, a wheel alignment machine, a brake lathe, a wheel balancer, a tire tread measurement machine, a compression gauge, a fuel pressure gauge, an oil pressure gauge, a temperature gauge, or an air conditioning manifold gauge set.

16. The computing system according to claim 14, wherein the measurement tool includes a digital volt ohm meter.

17. The computing system according to claim 14, wherein the processor communicates with the measurement tool using a wireless communication protocol.

18. The computing system according to claim 14,
wherein the program instructions, when executed by the processor, further cause the computing system to determine first feedback data associated with performing the diagnostic flowchart, and
wherein the first feedback data includes one or more from among:
data indicative of performing the first path element of the diagnostic flowchart,
data indicative of a decision made for at least one decision element of the diagnostic flowchart, or data indicative of whether the performance of the diagnostic flowchart results in a correct diagnosis of the diagnostic trouble code.

19. The computing system according to claim 14, wherein execution of the program instructions by the processor further cause the computing system to determine the measurement of the vehicle component by transmitting a second message to the electronic control unit in the particular vehicle and receiving vehicle data from the particular vehicle, and wherein the vehicle data is indicative of the measurement.

20. The computing system according to claim 19, wherein the vehicle data from the particular vehicle includes a parameter identifier and a parameter value corresponding to the parameter identifier.

21. The computing system according to claim 14, wherein a vehicle interface coupled to the processor includes a transceiver and a receiver to transmit the vehicle data message using a vehicle data message protocol selected from among: a Society of Automotive Engineers J1850 vehicle data message protocol, a controller area network vehicle data message protocol, or a K-Line vehicle data message protocol.

22. The computing system according to claim 19, wherein the vehicle data from the particular vehicle includes vehicle data based on an electronic control unit in the particular vehicle controlling an output device of the electronic control unit.

23. A non-transitory computer-readable memory having stored therein instructions executable by a processor to cause a computing system to perform functions comprising:

determining a diagnostic trouble code contained within a vehicle data message received at the processor;

transmitting, to a computing server, a first request indicative of the diagnostic trouble code;

receiving, from the computing server, a diagnostic flowchart associated with the diagnostic trouble code, wherein:

the diagnostic flowchart comprises a first path element, a second path element, a third path element, a first decision element, and a second decision element, the first path element, the first decision element, and the second decision element are arranged within the diagnostic flowchart so that the first path element is performed before the first decision element or the second decision element is selected, the first path element includes a diagnostic step and a measurement step to be performed during performance of the diagnostic step, the second path element is arranged within the diagnostic flowchart to follow a selection of the first decision element, and the third path element is arranged within the diagnostic flowchart to follow a selection of the second decision element;

outputting, within a graphical user interface on a display, at least a first portion of the diagnostic flowchart, wherein the first portion of the diagnostic flowchart shows at least the first path element;

executing, in response to receiving an input, a first instruction to perform the first path element, wherein execution of first instruction to perform the first path element causes the processor to transmit: (i) a message to an electronic control unit in a particular vehicle, the message for requesting the electronic control unit to control a vehicle component for a time period, and (ii) a second instruction to a measurement tool, the second instruction for the measurement tool to determine a measurement of the vehicle component during the time period;

controlling the measurement tool, in response to the second instruction, to measure the vehicle component during the time period when the vehicle component is controlled in response to the message, wherein performing the first path element further comprises receiving, at the processor from the measurement tool, measurement data indicative of a vehicle component measurement;

selecting, based on a prompt of the first path element and the measurement data, the first decision element or the second decision element, and outputting, within the graphical user interface on the display, at least a second portion of the diagnostic flowchart, wherein the second portion of the diagnostic flowchart shows at least the second path element if the processor selected the first decision element or at least the third path element if the processor selected the second decision element.

* * * * *